(12) United States Patent
Quinn et al.

(10) Patent No.: US 7,888,426 B2
(45) Date of Patent: Feb. 15, 2011

(54) POLYMERIZABLE MATERIALS

(75) Inventors: Michael Hugh Quinn, Valparaiso, IN (US); Lawrence L. Chapoy, Barrington Hills, IL (US); John Christopher Phelan, Gurnee, IL (US)

(73) Assignee: Novartis AG, Basel (CH)

( * ) Notice: Subject to any disclaimer, the term of this patent is extended or adjusted under 35 U.S.C. 154(b) by 1043 days.

(21) Appl. No.: 11/704,127

(22) Filed: Feb. 8, 2007

(65) Prior Publication Data

US 2007/0149672 A1 Jun. 28, 2007

Related U.S. Application Data

(63) Continuation of application No. 10/676,173, filed on Oct. 1, 2003, now abandoned.

(60) Provisional application No. 60/420,626, filed on Oct. 23, 2002.

(51) Int. Cl.
*C08G 18/08* (2006.01)
*C08F 8/00* (2006.01)
*B02B 1/04* (2006.01)

(52) U.S. Cl. .................... 524/591; 525/61; 523/106

(58) Field of Classification Search ............... 524/591; 525/61; 523/106
See application file for complete search history.

(56) References Cited

U.S. PATENT DOCUMENTS

| | | | |
|---|---|---|---|
| 5,508,317 A | 4/1996 | Muller | 522/85 |
| 5,583,163 A | 12/1996 | Muller | 522/152 |
| 5,665,840 A | 9/1997 | Pohlmann et al. | 526/264 |
| 5,712,356 A | 1/1998 | Bothe et al. | 526/264 |
| 5,789,464 A | 8/1998 | Muller | 523/108 |
| 5,807,927 A | 9/1998 | Stockinger et al. | 525/58 |
| 5,849,810 A | 12/1998 | Muller | 522/85 |
| 5,849,841 A | 12/1998 | Muhlebach et al. | 522/59 |
| 5,871,675 A | 2/1999 | Muller et al. | 264/1.38 |
| 5,932,674 A | 8/1999 | Muller | 526/266 |
| 5,936,052 A | 8/1999 | Bothe et al. | 526/264 |
| 5,939,489 A | 8/1999 | Muller | 525/61 |
| 6,011,077 A | 1/2000 | Muller | 522/35 |
| 6,149,692 A | 11/2000 | Lally et al. | 8/444 |
| 6,149,842 A | 11/2000 | Lally et al. | 264/1.36 |
| 6,162,844 A | 12/2000 | Lally et al. | 523/106 |
| 6,165,408 A | 12/2000 | Steinmann | 264/496 |
| 6,221,303 B1 | 4/2001 | Steinmann | 264/496 |
| 6,265,509 B1 | 7/2001 | Muler | 526/266 |
| 6,303,687 B1 * | 10/2001 | Muller | 525/61 |
| 6,342,570 B1 | 1/2002 | Bothe et al. | 526/264 |
| 6,479,587 B1 | 11/2002 | Stockinger et al. | 525/131 |
| 2001/0037001 A1 | 11/2001 | Muller et al. | 525/329.4 |
| 2003/0025222 A1 | 2/2003 | Bothe et al. | 264/1.1 |

FOREIGN PATENT DOCUMENTS

| | | |
|---|---|---|
| EP | 0 932 635 | 7/2001 |
| WO | WO 00/31150 | 6/2000 |

* cited by examiner

*Primary Examiner*—William K Cheung
(74) *Attorney, Agent, or Firm*—Sheng-Hsin Hu; Jian Zhou

(57) ABSTRACT

The present invention provides a polymerizable material for making a polymeric article, the polymerizable material comprising: a water-soluble polyvinyl alcohol having crosslinkable groups; and a modifier in an amount sufficient to improve one or more physical properties of a polymeric article made from the polymerizable material, wherein the one or more physical properties are selected from the group consisting of stress at break (N/mm$^2$), percentage of elongation at break, toughness or energy to break (N·mm), and susceptibility to fracture. The modifier is selected from the group consisting of nanoparticles having a hydrophilic surface, a copolymer having hydrophobic groups or units for imparting at least one desired physical property to said ophthalmic device and hydrophilic groups or units in an amount sufficient to render the copolymer miscible with the polyvinyl alcohol, and mixtures thereof. In addition, the present invention provides a polymeric article obtained by polymerization of a polymerizable material of the invention and also a method for modifying one or more physical properties of a hydrogel article obtained from the polymerization of a crosslinkable polymer.

3 Claims, No Drawings

POLYMERIZABLE MATERIALS

This application is a continuation of U.S. patent application Ser. No. 10/676,173, filed Oct. 1, 2003, now abandoned which claims the benefit under USC §119 (e) of U.S. provisional application No. 60/420,626 filed Oct. 23, 2002, and is incorporated by reference in it's entirety.

The present invention is related to polymerizable materials useful for making polymeric articles, preferably ophthalmic devices, more preferably soft contact lenses. In particular, the present invention is related to a composition comprising a water-soluble, crosslinkable polyvinyl alchohol with crosslinkable groups and a modifier capable of imparting at least one desired physical property of an ophthalmic device made from the composition. The present invention is also related to a method for making a polymeric article, preferably ophthalmic devices, more preferably soft contact lenses from polymerizable materials of the invention. In addition, the present invention is related to a method for preparing a polymeric article having at least one desired physical property.

BACKGROUND

It is well known that contact lenses can be used for cosmetics and the correction of visual acuity. The ideal contact lens is one which is not only comfortable to wear for extended periods of time, but also easily and reproducibly manufactured at minimum cost in time and labor.

Contact lenses can be manufactured economically in large numbers by the so-called mold or full-mold process. Known contact lens-molding processes are described in, for example, PCT patent application no. WO/87/04390 or in EP-A 0 367 513. In a typical molding process, a predetermined amount of a polymerizable or crosslinkable material is placed in the female mold half and the mold is closed by placing the male mold half proximately to the female mold half to create a cavity having a desired geometry for a contact lens. Normally, a surplus of polymerizable or crosslinkable material is used so that when the male and female halves of the mold are closed, the excess amount of the material is expelled out into an overflow area adjacent to the mold cavity. The polymerizable or crosslinkable material remaining within the mold is polymerized or cross-linked with the delivery of radiation thereto through UV light, heat action, or another non-thermal methods. Since the geometry of the ophthalmic lens is specifically defined by the cavity between the male and female mold halves and since the geometry of the edge of the ophthalmic lens is defined by the contour of the two mold halves in the area where they make contact, a contact lens is manufactured into a final form between typically male and female mold halves, with no additional finishing work on the surface of the lens or the edges of the lens. Such full-mold process can reduce cost in the production of contact lenses. However, in a typical molding process, a contact lens, which is removed from the mold after curing, needs to undergo the other manufacturing processes such as hydration/extraction and sterilization. Therefore, there is still room for further reducing manufacturing cost of contact lenses.

U.S. Pat. Nos. 5,508,317, 5,583,463, 5,789,464, and 5,849,810 describe an improved manufacturing process for economically producing contact lenses in large numbers. By using a prepolymer which is a Water-soluble photo-crosslinkable polyvinyl alcohol, a finished lens of optical quality can be produced in a mold within a few seconds without the necessity for subsequent extraction or finishing steps to the contact lens. With such manufacturing process, contact lenses can be manufactured at considerably low cost and thus it is possible to produce disposable contact lenses that are discarded by the user after a single use.

Although contact lenses manufactured by one of the processes disclosed by U.S. Pat. Nos. 5,508,317, 5,583,463, 5,789,464, and 5,849,810 have advantageous properties such as a good compatibility with the human cornea resulting in a relatively high wearing comfort and the absence of irritation and allergenic effects, a need for further improvement still remains. For example, problems may sometimes show up in production of contact lenses from a water-soluble photo-crosslinkable polyvinyl alcohol. In particular, during mold opening and removing the contact lenses from the mold, cracks, flaws or tears may occur in the lenses or in the worst case the contact lenses even break totally. Contact lenses having such defects have to be discarded and lower the overall production yield. In addition, contact lenses made from a water-soluble photo-crosslinkable polyvinyl alcohol do not always posses all of most desirable physical properties, for example, such as elasticity and durability, for the intended uses.

One object of the invention is to provide a polymerizable composition useful for economically producing soft contact lenses having improved durability, elasticity and/or other desired physical properties.

Another object of the invention is to provide an improved method for economically producing soft contact lenses having improved durability, elasticity and/or other desired physical properties.

SUMMARY OF THE INVENTION

In accomplishing the foregoing, there is provided, in accordance with one aspect of the present invention, a polymerizable material for making a polymeric article, the polymerizable material comprising: a water-soluble polyvinyl alcohol having crosslinkable groups; and a modifier in an amount sufficient to improve one or more physical properties of a polymeric article made from the polymerizable material, wherein the one or more physical properties are selected from the group consisting of stress at break ($N/mm^2$), percentage of elongation at break, toughness or energy to break ($N·mm$), and susceptibility to fracture.

In another aspect, the present invention provides a polymeric article which is a product of radiation-crosslinking of an above-described polymerizable material of the invention in the presence or preferably in the absence of one or more additional vinylic monomers.

In a further aspect, the present invention provides an ophthalmic device, preferably a soft contact lens, which is obtained by crosslinking an above-described polymerizable material of the invention in the presence or preferably in the absence of one or more additional vinylic monomers.

In another further aspect, the present invention provides a method for producing an ophthalmic device, the method comprising the steps of: a) introducing an above-described polymerizable material of the invention, in the presence or preferably in the absence of one or more additional vinylic comonomers, and optionally in the presence of a photo-initiator, into a mold; b) crosslinking by actinic radiation the polymerizable material, and c) opening the mold so that the ophthalmic device can be removed from the mold.

In still a further aspect, the present invention provides a method for modifying one or more physical properties of a hydrogel article obtained from the polymerization of a crosslinkable polymer, the method comprising the steps of:

adding, into a solution of said crosslinkable polymer, a modifier in an amount sufficient to modify said one or more physical properties of said polymeric article, wherein said modifier is selected from the group consisting of nanoparticles having a hydrophilic surface, a copolymer having hydrophobic groups or units for imparting at least one desired physical property to said hydrogel article and hydrophilic groups or units in an amount sufficient to render it miscible with the crosslinkable polymer, and mixtures thereof; mixing thoroughly said modifier and the crosslinkable polymer; and crosslinking said crosslinkable polymer in the presence of the modifier to obtain said hydrogel article, wherein the one or more physical properties are selected from the group consisting of stress at break (N/mm$^2$), percentage of elongation at break, toughness or energy to break (N·mm), and susceptibility to fracture.

These and other aspects of the invention will become apparent from the following description of the preferred embodiments. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

In one aspect, the present invention relates to a polymerizable material for making an ophthalmic device, preferably a contact lens. A polymerizable material of the invention comprises: a water-soluble polyvinyl alcohol having crosslinkable groups; and a modifier in an amount sufficient to improve one or more physical properties of a polymeric article made from the polymerizable material, wherein the one or more physical properties are selected from the group consisting of stress at break (N/mm$^2$), percentage of elongation at break, toughness or energy to break (N·mm), and susceptibility to fracture.

"Improvement in the stress at break (N/mm$^2$) of an ophthalmic device" means that the ophthalmic device, prepared from a composition composed of a water-soluble polyvinyl alcohol having crosslinkable groups and a modifier, has an increased value of the stress at break relative to an ophthalmic device prepared from a composition composed of a water-soluble polyvinyl alcohol without the modifier.

"Improvement in the percentage of elongation at break, of an ophthalmic device" means that the ophthalmic device, prepared from a composition composed of a water-soluble polyvinyl alcohol having crosslinkable groups and a modifier, has an increased value of percentage of elongation at break relative to an ophthalmic device prepared from a composition composed of a water-soluble polyvinyl alcohol without the modifier.

"Improvement in the toughness or energy to break (N·mm) of an ophthalmic device" means that the ophthalmic device, prepared from a composition composed of a water-soluble polyvinyl alcohol having crosslinkable groups and a modifier, has an increased value of the toughness or energy to break (N·mm) relative to an ophthalmic device prepared from a composition composed of a water-soluble polyvinyl alcohol without the modifier.

"Improvement in susceptibility to fracture of an ophthalmic device" means that the ophthalmic device, prepared from a composition composed of a water-soluble polyvinyl alcohol having crosslinkable groups and a modifier, is less susceptible to fracture relative to an ophthalmic device prepared from a composition composed of a water-soluble polyvinyl alcohol without the modifier.

An "ophthalmic device", as used herein, refers to a contact lens (hard or soft), an intraocular lens, a corneal onlay, and other ophthalmic devices (e.g., stents, implants, or the like) used on or about the eye or ocular vicinity. An ophthalmic device according to the invention is preferably a soft contact lens, more preferably a hydrogel contact lens.

A "crosslinkable group", as used herein, refer to a photo-crosslinkable or thermally crosslinkable group well known to the person skilled in the art. Crosslinkable groups such as those already proposed for the preparation of contact lens materials are especially suitable. Those include especially, but not exclusively, groups comprising carbon-carbon double bonds.

A "radiation-curable prepolymer" refers to a starting polymer which can be crosslinked upon actinic radiation to obtain a crosslinked polymer having a molecular weight much higher than the starting polymer. Examples of actinic radiation are UV irradiation, ionized radiation (e.g. gamma ray or X-ray irradiation), microwave irradiation, and the like.

A "hydrophilic vinylic monomer" refers to a monomer which as a homopolymer typically yields a polymer that is water-soluble or can absorb at least 10 percent by weight water.

A "hydrophobic vinylic monomer" refers to a monomer which as a homopolymer typically yields a polymer that is insoluble in water and can absorb less than 10 percent by weight water.

A water-soluble crosslinkable poly(vinyl alcohol) according to the invention is preferably a polyhydroxyl compound which has a molecular weight of at least about 2000 and which comprises from about 0.5 to about 80%, based on the number of hydroxyl groups in the poly(vinyl alcohol), of units of the formula I, I and II, I and III, or I and II and III

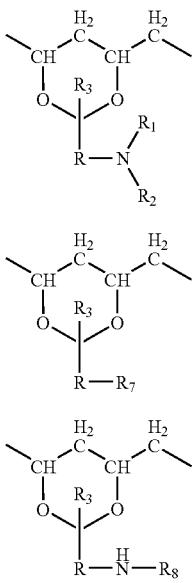

A "molecular weight", as used herein, refers to a weight average molecular weight, Mw, determined by gel permeation chromatography, unless otherwise specified.

In formula I, II and III, $R_3$ is hydrogen, a $C_1$-$C_6$ alkyl group or a cycloalkyl group.

In formula I, II and III, R is alkylene having up to 12 carbon atoms, preferably up to 8 carbon atoms, and can be linear or branched. Suitable examples include octylene, hexylene, pentylene, butylene, propylene, ethylene, methylene, 2-propylene, 2-butylene and 3-pentylene. Lower alkylene R preferably has up to 6, particularly preferably up to 4 carbon atoms. Methylene and butylene are particularly preferred.

In the formula I, $R_1$ is hydrogen or lower alkyl having up to seven, in particular up to four, carbon atoms. Most preferably, $R_1$ is hydrogen.

In the formula I, $R_2$ is an olefinically unsaturated, electron-withdrawing, crosslinkable radical, preferably having up to 25 carbon atoms. In one embodiment, $R_2$ is an olefinically unsaturated acyl radical of the formula $R_4$—CO—, in which $R_4$ is an olefinically unsaturated, crosslinkable radical having 2 to 24 carbon atoms, preferably having 2 to 8 carbon atoms, particularly preferably having 2 to 4 carbon atoms.

The olefinically unsaturated, crosslinkable radical $R_4$ having 2 to 24 carbon atoms is preferably alkenyl having 2 to 24 carbon atoms, in particular alkenyl having 2 to 8 carbon atoms, particularly preferably alkenyl having 2 to 4 carbon atoms, for example ethenyl, 2-propenyl, 3-propenyl, 2-butenyl, hexenyl, octenyl or dodecenyl. Ethenyl and 2-propenyl are preferred, so that the —CO—$R_4$ group is the acyl radical of acrylic acid or methacrylic acid.

In another embodiment, the radical $R_2$ is a radical of the formula IV, preferably of the formula V

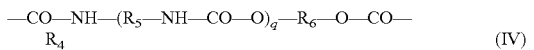 (IV)

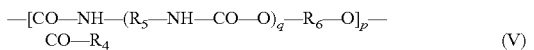 (V)

in which p and q, independently of one another, are zero or one, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which $R_4$ is as defined above.

Lower alkylene $R_5$ or $R_6$ preferably has 2 to 6 carbon atoms and is, in particular, linear. Suitable examples include propylene, butylene, hexylene, dimethylethylene and, particularly preferably, ethylene.

Arylene $R_5$ or $R_6$ is preferably phenylene, which is unsubstituted or substituted by lower alkyl or lower alkoxy, in particular 1,3-phenylene or 1,4-phenylene or methyl-1,4-phenylene.

A saturated bivalent cycloaliphatic group $R_5$ or $R_6$ is preferably cyclohexylene or cyclohexylene(lower alkylene), for example cyclohexylenemethylene, which is unsubstituted or substituted by one or more methyl groups, for example trimethylcyclohexylenemethylene, for example the bivalent isophorone radical.

The arylene unit of alkylenearylene or arylenealkylene $R_5$ or $R_6$ is preferably phenylene, unsubstituted or substituted by lower alkyl or lower alkoxy, and the alkylene unit thereof is preferably lower alkylene, such as methylene or ethylene, in particular methylene. Radicals $R_5$ or $R_6$ of this type are therefore preferably phenylenemethylene or methylenephenylene.

Arylenealkylenearylene $R_5$ or $R_6$ is preferably phenylene(lower alkylene)phenylene having up to 4 carbon atoms in the alkylene unit, for example phenyleneethylenephenylene.

The radicals $R_5$ and $R_6$ are preferably, independently of one another, lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene or phenylene(lower alkylene)phenylene.

In the formula II, $R_7$ is a primary, secondary or tertiary amino group or a quaternary amino group of the formula $N^+(R')_3X^-$, in which each R', independently of the others, is hydrogen or a $C_1$-$C_4$ alkyl radical and X is a counterion, for example $HSO_4^-$, $F^-$, $Cl^-$, $Br^-$, $I^-$, $CH_3COO^-$, $OH^-$, $BF^-$, or $H_2PO_4^-$.

The radicals $R_7$ are, in particular, amino, mono- or di(lower alkyl)amino, mono- or diphenylamino, (lower alkyl)phenylamino or tertiary amino incorporated into a heterocyclic ring, for example —$NH_2$, —NH—$CH_3$, —$N(CH_3)_2$, —NH($C_2H_5$), —$N(C_2H_5)_2$, —NH(phenyl), —$N(C_2H_5)$phenyl or

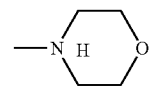

In the formula III, $R_8$ is the radical of a monobasic, dibasic or tribasic, saturated or unsaturated, aliphatic or aromatic organic acid or sulfonic acid. Preferred radicals $R_8$ are derived, for example, from chloroacetic acid, succinic acid, glutaric acid, adipic acid, pimelic acid, maleic acid, fumaric acid, itaconic acid, citraconic acid, acrylic acid, methacrylic acid, phthalic acid and trimellitic acid.

For the purposes of this invention, the term "lower" in connection with radicals and compounds denotes, unless defined otherwise, radicals or compounds having up to 7 carbon atoms, preferably having up to 4 carbon atoms.

Lower alkyl has, in particular, up to 7 carbon atoms, preferably up to 4 carbon atoms, and is, for example, methyl, ethyl, propyl, butyl or tert-butyl.

Lower alkoxy has, in particular, up to 7 carbon atoms, preferably up to 4 carbon atoms, and is, for example, methoxy, ethoxy, propoxy, butoxy or tert-butoxy.

The bivalent group —$R_5$—NH—CO—O— is present if q is one and absent if q is zero. Poly(vinyl alcohol)s containing crosslinkable groups in which q is zero are preferred.

The bivalent group —CO—NH—($R_5$—NH—CO—O)q-$R_6$—O— is present if p is one and absent if p is zero. Poly(vinyl alcohol)s containing crosslinkable groups in which p is zero are preferred.

In the poly(vinyl alcohol)s comprising units containing crosslinkable groups in which p is one, the index q is preferably zero. Particular preference is given to poly(vinyl alcohol)s comprising crosslinkable groups in which p is one, the index q is zero and $R_5$ is lower alkylene.

In the formula $N^+(R')_3X^-$, R' is preferably hydrogen or $C_1$-$C_3$ alkyl, and X is halide, acetate or phosphite, for example —$N^+(C_2H_5)_3CH_3COO^-$, —$N^+(C_2H_5)_3Cl^-$, and —$N^+(C_2H_5)_3 H_2PO_4^-$.

A water-soluble crosslinkable poly(vinyl alcohol) according to the invention is more preferably a polyhydroxyl compound which has a molecular weight of at least about 2000 and which comprises from about 0.5 to about 80%, preferably from 1 to 50%, more preferably from 1 to 25%, even more preferably from 2 to 15%, based on the number of hydroxyl groups in the poly(vinyl alcohol), of units of the formula I, wherein R is lower alkylene having up to 6 carbon atoms, $R_1$ is hydrogen or lower alkyl, $R_3$ is hydrogen, and $R_2$ is a radical of formula (V). Where p is zero, $R_4$ is preferably $C_2$-$C_8$ alkenyl. Where p is one and q is zero, $R_6$ is preferably $C_2$-$C_6$ alkylene and $R_4$ is preferably $C_2$-$C_8$ alkenyl. Where both p and q are one, $R_5$ is preferably $C_2$-$C_6$ alkylene, phenylene, unsubstituted or lower alkyl-substituted cyclohexylene or cyclo hexylene-lower alkylene, unsubstituted or lower alkyl-substituted phenylene-lower alkylene, lower alkylene-phenylene, or phenylene-lower alkylene-phenylene, $R_6$ is preferably $C_2$-$C_6$ alkylene, and $R_4$ is preferably $C_2$-$C_8$ alkenyl.

A water-soluble crosslinkable poly(vinyl alcohol) according to the invention has a molecular weight of at least about 2000.

Crosslinkable poly(vinyl alcohol)s comprising units of the formula I, I and II, I and III, or I and II and III can be prepared in a manner known per se. For example, U.S. Pat. Nos. 5,583, 163 and 6,303,687 disclose and teach how to prepare crosslinkable polymers comprising units of the formula I, I and II, I and III, or I and II and III.

A water-soluble crosslinkable poly(vinyl alcohol) according to the invention is preferably in extremely pure form, for example, in the form of concentrated aqueous solutions that are free, or at least substantially free, from reaction products and starting materials (e.g., salts, non-polymeric constituents). Purification can be carried out according to any techniques known to a person skilled in the art, for example, by precipitation with acetone, dialysis or ultrafiltration. A preferred purification process is ultrafiltration, which can be carried out repeatedly, e.g., from two to ten times, or continuously until a selected degree of purity is achieved. A suitable measure for the degree of purity is, for example, the sodium chloride concentration of the solution.

A modifier according to the invention is a material the presence of which in a polymerizable material can improve at least one physical property of an ophthalmic device made from the polymerizable material. Examples of physical properties are stress at break (N/mm$^2$), percentage of elongation at break, toughness or energy to break (N·mm), and susceptibility to fracture.

In one embodiment, a modifier is composed of nanoparticles having a hydrophilic surface. Exemplary nanoparticles having a hydrophilic surface are nano-sized silica fillers.

In another embodiment, a modifier is composed of one or more copolymers each having hydrophilic groups or units in an amount sufficient to render it miscible with the water-soluble polyvinyl alcohol and hydrophobic groups or units for imparting at least one desired physical property to said ophthalmic device.

In another embodiment, a modifier is composed of a mixture of nanoparticles having a hydrophilic surface and at least one copolymer having hydrophilic groups or units in an amount sufficient to render it miscible with the water-soluble polyvinyl alcohol and hydrophobic groups or units for imparting at least one desired physical property to the polymeric article made from the polymerizable material.

It has been discovered here that although it is possible to find a homopolymer of hydrophilic monomer (such as, for example, poly(vinyl pyrrolidone) (PVP) or a dextrane) to be miscible with a water-soluble polyvinyl alcohol, blending of such hydrophilic homopolymer with the water-soluble polyvinyl alcohol does not allow to make contact lenses having a significantly improved physical property. However, it is found that by blending a copolymer, having a balanced composition of hydrophilic and hydrophobic groups or units, with a water-soluble polyvinyl alcohol, it is possible to prepare a contact lens having at least one significantly improved physical property. It is believed that hydrophilic groups or units miscible with the water-soluble polyvinyl alcohol should be present in an amount sufficient to ensure a desired miscibility of the copolymer with the water-soluble polyvinyl alcohol. While the claimed invention is not limited to the theory developed to support this unexpected result, a proposed theory is presented herein in order to enable the reader to better understand the invention. It is believed that, in a polymeric article obtained by polymerizing a water-soluble polyvinyl alcohol in the presence of a copolymer having a balanced composition of hydrophilic and hydrophobic groups or units, the hydrophilic groups or units the copolymer are intertwined with the polymer meshwork of polyvinyl alcohol, whereas the hydrophobic groups or units may form nano-composites or microscopically co-continuous phases. Such nano-composites or microscopically co-continuous phases may impart one or more improved physical properties to the polymeric article.

It is understood that a copolymer, having a balanced composition of hydrophilic and hydrophobic groups or units, as a modifier in accordance with the present invention can optionally contain crosslinkable groups. By having crosslinkable groups, a copolymer can be covalently anchored to the polymeric meshwork in a polymeric article. With such covalent attachment of a modifier, there is no need for subsequent extraction or finishing steps to the contact lenses produced from a composition composed of a water soluble polyvinyl alcohol and a modifier neither concerns about the possibility of leaching out of a modifier from contact lenses. Therefore, contact lenses can be manufactured at considerably low cost and it is possible to produce disposable contact lenses that are discarded by the user after a single use.

Where a copolymer used as a modifier does not contain crosslinkable groups, it preferably has a relatively high molecular weight.

Any known suitable copolymer having a balanced composition of hydrophilic and hydrophobic groups or units can be used in the present invention. A person skilled in the art will know well how to select a copolymer as a modifier and how to make a copolymer according to any known suitable method.

One example of a copolymer as a modifier is a non-crosslinkable polyurethane or a crosslinkable polyurethane. For example, a modifier according to the present invention is a vinyl group-terminated polyurethane, which is prepared by reacting an isocyanate-capped polyurethane with an ethylenically unsaturated amine (primary or secondary amine) or an ethylenically unsaturated monohydroxy compound.

An isocyanate-capped polyurethane according to the invention is a copolymerization product of
(a) at least one polyalkylene glycol of formula

wherein $R_9$, $R_{10}$, and $R_{11}$, independently of one other, are each linear or branched $C_2$-$C_4$-alkylene, and n, m and l, independently of one another, are each a number from 0 to 100, wherein the sum of (n+m+l) is 5 to 100,
(b) at least one branching agent selected from the group consisting of
(i) a linear or branched aliphatic polyhydroxy compound of formula

wherein $R_{12}$ is a linear or branched $C_3$-$C_{18}$ aliphatic multivalent radical and x is a number $\geq 3$,
(ii) a polyether polyol, which is the polymerization product of a compound of formula (2) and a glycol,
(iii) a polyester polyol, which is the polymerization product of a compound of formula (2), a dicarboxylic acid or a derivative thereof and a diol, and
(iv) a cycloaliphatic polyol selected from the group consisting of a $C_5$-$C_8$-cycloalkane which is substituted by $\geq 3$ hydroxy groups and which is unsubstituted by alkyl radical, a $C_5$-$C_8$-cycloalkane which is substituted by $\geq 3$ hydroxy groups and which is substituted by one or more $C_1$-$C_4$ alkyl radicals, and an unsubstituted mono- and disaccharide,
(v) an aralkyl polyol having at least three hydroxy $C_1$-$C_4$ alkyl radicals, and
(c) at least one di- or polyisocyanate of formula

wherein $R_{13}$ a linear or branched $C_3$-$C_{24}$ aliphatic polyisocyanate, the radical of a $C_3$-$C_{24}$ cycloaliphatic or aliphatic-cycloaliphatic polyisocyanate, or the radical of a $C_3$-$C_{24}$ aromatic or araliphatic polyisocyanate, and y is a number from 2 to 6.

In formula (1), n, m and l, independently of one another, preferably each denote a number from 0 to 50, whereby the sum of (n+m+l) is 8 to 50. Most preferably, n, m and l, independently of one another, each denote a number from 0 to 25, whereby the sum of (n+m+l) is 9 to 25.

In formula (1), where I is zero, n and m, independently of one another, are each a number from 0 to 100, preferably 0 to 50, and most preferably 0 to 25, and the sum of (n+m) is 5 to 100, preferably 8 to 50, most preferably 9 to 25.

In formula (1), where l and m are each 0, n is a number from 5 to 100, preferably 8 to 50, most preferably 9 to 25.

Exemplary poly(alkylene glycol)s include, but are not limited to a poly(ethylene glycol), a poly(propylene glycol), a poly(ethylene glycol)/poly(propylene glycol) block polymer, a poly(ethylene glycol)/poly(propylene glycol)/poly(butylene glycol) block polymer, a polytetrahydrofuran, a poloxamer, and mixtures thereof.

Poloxamers are hydroxy terminated tri-block copolymers with the structure PEG-PPG-PEG (where "PEG" is poly(ethylene glycol) and "PPG" is poly(propylene glycol)) and are available, for example, under the tradename PLURONIC®.

The order of PEG and PPG blocks can be reversed creating block copolymers with the structure PPG-PEG-PPG, which are available, for example, under the tradename PLURONIC-R®. A considerable number of poloxamers is known, differing merely in the molecular weight and in the PEG/PPG ratio. Examples are poloxamer 101, 105, 108, 122, 123, 124, 181, 182, 183, 184, 185, 188, 212, 215, 217, 231, 234, 235, 237, 238, 282, 284, 288, 331, 333, 334, 335, 338, 401, 402, 403 and 407. Poloxamer 101 has a PEG/PPG weight ratio of about 10/90 and poloxamer 108 having a PEG/PPG weight ratio of about 80/20.

Polyoxypropylene-polyoxyethylene block copolymers can also be designed with hydrophilic blocks comprising a random mix of ethylene oxide and propylene oxide repeating units. To maintain the hydrophilic character of the block, ethylene oxide will predominate. Similarly, the hydrophobic block can be a mixture of ethylene oxide and propylene oxide repeating units. Such block copolymers are available under the tradename PLURADOT®.

The weight average molecular weight of poloxamers may vary within wide limits. An average molecular weight of, may be, for example, from about 1000 to 20000, preferably from 1000 to 15000, more preferably from 1000 to 8000 and in particular from 1000 to 5000.

A branching agent of formula (2) is preferably a linear or branched $C_3$ to $C_{12}$ aliphatic polyol, more preferably a linear or branched $C_3$ to $C_8$ aliphatic polyol. The variable x in formula (2) is preferably a number from 3 to 12, more preferably a number from 3 to 8, even more preferably a number from 3 to 6, and most preferably the number 3.

Examples of a branching agent of formula (2) are glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- or tripentaerythritol, arabitol, sorbitol, disorbitol or mannitol and mixtures thereof. Preferred compounds of formula (2) are glycerol, 1,1,1-trishydroxymethylpropane, 1,2,4-butanetriol, erythritol, pentaerythritol, arabitol or sorbitol. A group of preferred branching agents of formula (2) comprises glycerol, 1,1,1-trishydroxymethylpropane, pentaerythritol, and pentaerythritol ethoxylate.

Further suitable as a branching agent according to (b) are reaction products of the above-mentioned polyhydroxy compounds of formula (2) with a dicarboxylic acid, a dicarboxylic acid anhydride, a dicarboxylic acid ester, a dicarboxylic acid halide, or a diol.

Where at least one branching agent according to (b) is a polyester polyol, the branching agent is preferably an oligomeric reaction product of a compound of formula (2), wherein the above-mentioned meanings and preferences apply, with an aliphatic or cycloaliphatic dicarboxylic acid having 3 to 12 carbon atoms, or an aromatic dicarboxylic acid having 5 to 15 carbon atoms, or an appropriate derivative thereof, e.g. a corresponding dicarboxylic acid anhydride, ester or halide, as well as a diol as chain extender. Examples of suitable dicarboxylic acids are malonic acid, succinic acid, 2,2-dimethylsuccinic acid, glutaric acid, adipic acid, pimelic acid, sebacic acid, tetrahydrophthalic acid, hexahydrophthalic acid, phthalic acid, isophthalic acid, terephthalic acid, maleic acid or fumaric acid, as well as the corresponding dicarboxylic acid esters, halides or anhydrides. Appropriate diols are e.g. linear or branched $C_2$-$C_{20}$-alkyl-diols.

Where at least one branching agent according to (b) is a cycloaliphatic polyol, the branching agent may be e.g. cyclopentane or preferably a cyclohexane, which is respectively substituted by 3 to 5 and preferably by 3 or 4 hydroxy groups and bears no further substituents or hetero atoms. Further suitable cycloaliphatic polyols according to (b) are represented by unsubstituted mono- or disaccharides, e.g. glucose, fructose, mannose, galactose, maltose, lactose or saccharose.

In formula (3), y is preferably a number from 2 to 4, more preferably 2.

Where y is 2 in the formula (3), $R_{13}$ is the radical of a linear or branched $C_3$-$C_{18}$-alkylene, an unsubstituted or $C_1$-$C_4$-alkyl-substituted or $C_1$-$C_4$-alkoxy-substituted $C_6$-$C_{10}$-arylene, a $C_7$-$C_{18}$-aralkylene, a $C_6$-$C_{10}$-arylene-$C_1$-$C_2$-alkylene-$C_6$-$C_{10}$-arylene, a $C_3$-$C_8$-cycloalkylene, a $C_3$-$C_8$-cycloalkylene-$C_1$-$C_6$-alkylene, a $C_3$-$C_8$-cycloalkylene-$C_1$-$C_2$-alkylene-$C_3$-$C_8$-cycloalkylene, or a $C_1$-$C_6$-alkylene-$C_3$-$C_8$-cycloalkylene-$C_1$-$C_6$-alkylene.

Where $R_{13}$ is the radical of an alkylene, $R_{13}$ is preferably a linear or branched $C_4$-$C_{12}$-alkylene radical, more preferably a linear or branched $C_6$-$C_{10}$-alkylene radical. Examples of preferred alkylene radicals are 1,4-butylene, 2,2-dimethyl-1,4-butylene, 1,5-pentylene, 2,2-dimethyl-1,5-pentylene, 1,6-hexylene, 2,2,3- or 2,2,4-trimethyl-1,5-pentylene, 2,2-dimethyl-1,6-hexylene, 2,2,3- or 2,2,4- or 2,2,5-trimethyl-1,6-hexylene, 2,2-dimethyl-1,7-heptylene, 2,2,3- or 2,2,4- or 2,2,5- or 2,2,6-trimethyl-1,7-heptylene, 1,8-octylene, 2,2-dimethyl-1,8-octylene or 2,2,3- or 2,2,4- or 2,2,5- or 2,2,6- or 2,2,7-trimethyl-1,8-octylene.

Where $R_{13}$ is the radical of an arylene, the arylene is preferably naphthylene, more preferably phenylene. If the arylene is substituted, a substituent is preferably located in ortho position to an isocyanate group. Examples of substituted arylene are 1-methyl-2,4-phenylene, 1,5-dimethyl-2,4-diphenylene, 1-methoxy-2,4-phenylene or 1-methyl-2,7-naphthylene.

Where $R_{13}$ is the radical of an aralkylene, the aralkylene is preferably naphthylalkylene, more preferably phenylalkylene. The alkylene group in aralkylene preferably contains 1 to 12, more preferably 1 to 6, even more preferably 1 to 4, most preferably 1 to 2 C-atoms. A few examples are 1,3- or 1,4-benzylene, naphth-2-yl-7-methylene, 6-methyl-1,3- or -1,4-benzylene, 6-methoxy-1,3- or -1,4-benzylene.

Where $R_{13}$ is the radical of a cycloalkylene, the cycloalkylene is preferably $C_5$-$C_6$-cycloalkylene, more preferably cyclohexylene which is respectively unsubstituted or methyl-substituted. A few examples are 1,3-cyclobutylene, 1,3-cyclopentylene, 1,3- or 1,4-cyclohexylene, 1,3- or 1,4-cycloheptylene, 1,3- or 1,4- or 1,5-cyclooctylene, 4-methyl-1,3-cyclopentylene, 4-methyl-1,3-cyclohexylene, 4,4-dimethyl-1,3-cyclohexylene, 3-methyl- or 3,3-dimethyl-1,4-cyclohexylene, 3,5-dimethyl-1,3-cyclohexylene, 2,4-dimethyl-1,4-cyclohexylene.

Where $R_{13}$ is the radical of a cycloalkylene-alkylene, the cycloalkylene-alkylene is preferably cyclopentylene-$C_1$-$C_4$-alkylene, more preferably cyclohexylene-$C_1$-$C_4$-alkylene which is respectively unsubstituted or substituted once or several times by $C_1$-$C_4$-alkyl, especially methyl. The group cycloalkylene-alkylene preferably denotes cyclohexylene-ethylene and most preferably denotes cyclohexylene-methylene, which is respectively unsubstituted in the cyclohexylene radical or substituted by 1 to 3 methyl groups. A few examples are cyclopent-1-yl-3-methylene, 3-methyl-cyclopent-1-yl-3-methylene, 3,4-dimethyl-cyclopent-1-yl-3-methylene, 3,4,4-trimethyl-cyclopent-1-yl-3-methylene, cyclohex-1-yl-3- or -4-methylene, 3- or 4- or 5-methyl-cyclohex-1-yl-3- or -4-methylene, 3,4- or 3,5-dimethyl-cyclohex-1-yl-3- or -4-methylene, 3,4,5- or 3,4,4- or 3,5,5-trimethyl-cyclohex-1-yl-3- or -4-methylene.

Where $R_{13}$ is the radical of an alkylene-cycloalkylene-alkylene, the alkylene-cycloalkylene-alkylene is preferably $C_1$-$C_4$-alkylene-cyclopentylene-$C_1$-$C_4$-alkylene and especially $C_1$-$C_4$-alkylene-cyclohexylene-$C_1$-$C_4$-alkylene, which is respectively unsubstituted or substituted once or several times by $C_1$-$C_4$-alkyl, most preferably methyl. The group alkylene-cycloalkylene-alkylene preferably denotes ethylene-cyclohexylene-ethylene and most preferably methylene-cyclohexylene-methylene, which is respectively unsubstituted in the cyclohexylene radical or substituted by 1 to 3 methyl groups. A few examples are cyclopentane-1,3-dimethylene, 3-methyl-cyclopentane-1,3-dimethylene 3,4-dimethyl-cyclopentane-1,3-dimethylene, 3,4,4-trimethyl-cyclopentane-1,3-dimethylene, cyclohexane-1,3- or -1,4-dimethylene, 3- or 4- or 5-methyl-cyclohexane-1,3- or -1,4-dimethylene, 3,4- or 3,5-dimethyl-cyclohexane-1,3- or -1,4-dimethylene, 3,4,5- or 3,4,4- or 3,5,5-trimethyl-cyclohexane-1,3- or -1,4-dimethylene.

Where $R_{13}$ is the radical of a cycloalkylene-alkylene-cycloalkylene, the cycloalkylene-alkylene-cycloalkylene is preferably $C_5$-$C_6$-cycloalkylene-methylene-$C_5$-$C_6$-cycloalkylene, which may respectively be unsubstituted in the cycloalkyl ring by one or more methyl groups.

Where $R_{13}$ is the radical of an arylene-alkylene-arylene, the arylene-alkylene-arylene is preferably phenylene-methylene-phenylene, which may respectively be unsubstituted in the phenyl ring by one or more methyl groups.

Examples of especially preferred diisocyanates of formula (3) are isophorone diisocyanate (IPDI), methylenebis(cyclohexyl-isocyanate), 1,6-diisocyanato-2,2,4-trimethyl-n-hexane (TMDI), methylenebis(phenyl-isocyanate) or hexamethylene-diisocyanate (HMDI).

Examples of ethylenically unsaturated monohydroxy compound includes, without limitation, hydroxy-substituted lower alkylacrylates and -methacrylates, hydroxy-substituted lower alkyl-acrylamides and -methacrylamides, hydroxy-substituted lower alkylvinyl-ethers. Examples of hydroxy-substituted lower alkylacrylates and -methacrylates are 2-hydroxyethyl acrylate and 2-hydroxyethyl methacrylate.

An ethylenically unsaturated amine has formula (4), (4') or (4")

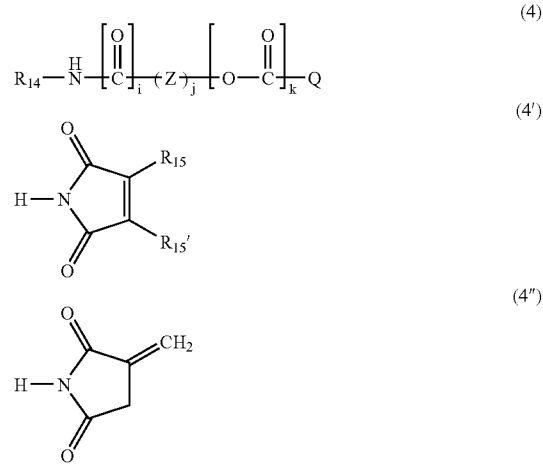

In which, i, j and k, independent of one another, are o or 1;

$R_{14}$ is hydrogen, a linear or branched $C_1$-$C_{24}$ alkyl, a $C_2$-$C_{24}$ alkoxyalkyl, a $C_2$-$C_{24}$ alkylcarbonyl, a $C_2$-$C_{24}$ alkoxycarbonyl, an unsubstituted or $C_1$-$C_4$ alkyl- or $C_1$-$C_4$ alkoxy-substituted $C_6$-$C_{10}$ aryl, a $C_7$-$C_{18}$ aralkyl, a $C_{13}$-$C_{22}$ arylalkylaryl, a $C_3$-$C_8$ cycloalkyl, a $C_4$-$C_{14}$ cycloalkylalkyl, a $C_7$-$C_{18}$ cycloalkylalkylcycloalkyl, a $C_5$-$C_{20}$ alkylcycloalkylalkyl, or an aliphatic-heterocyclic radical;

Z is a $C_1$-$C_{12}$ alkylene radical, phenylene radical or $C_7$-$C_{12}$ aralkylene radical;

$R_{15}$ and $R_{15}'$, independently of each other, are hydrogen, $C_1$-$C_4$ alkyl or halogen; and Q is an ethylenically unsaturated copolymerizable radical having from 2 to 24 carbon atoms which may be further substituted.

Aryl $R_{14}$ is a carbocyclic aromatic radical, which is unsubstituted or substituted by preferably lower alkyl ($C_1$-$C_4$) or lower alkoxy ($C_1$-$C_4$). Examples are phenyl, toluyl, xylyl, methoxyphenyl, t-butoxyphenyl, naphthyl or phenanthryl.

Cycloalkyl $R_{14}$ is preferably $C_5$-$C_6$ cycloalkyl and most preferably cyclohexyl that is unsubstituted or substituted by methyl. Some examples are cyclobutyl, cyclopentyl, cyclohexyl, cycloheptyl, cyclooctyl, 4-methyl-cyclopentyl, 4-methyl-cyclohexyl, 4,4-dimethyl-cyclohexyl, 3-methyl- or 3,3-dimethyl-cyclohexyl, 3,5-dimethyl-cyclohexyl and 2,4-dimethyl-cyclohexyl.

When $R_{14}$ is cycloalkylalkyl, it is preferably cyclopentyl-$C_1$-$C_4$ alkyl and especially cyclohexyl-$C_1$-$C_4$ alkyl, each unsubstituted or mono- or poly-substituted by $C_1$-$C_4$ alkyl, especially methyl. More preferably, the group cycloalkylalkyl is cyclohexylethyl and, most preferably, cyclohexylmethyl, each unsubstituted or substituted in the cyclohexyl radical by from 1 to 3 methyl groups.

When $R_{14}$ is alkylcycloalkylalkyl, it is preferably $C_1$-$C_4$ alkyl-cyclopentyl-$C_1$-$C_4$ alkyl and especially $C_1$-$C_4$ alkyl-cyclohexyl-$C_1$-$C_4$ alkyl, each unsubstituted or mono- or poly-substituted by $C_1$-$C_4$ alkyl, especially methyl. More preferably, the group alkylcycloalkylalkyl is ethylcyclohexylethyl and, most preferably, is methylcyclohexylmethyl, each unsubstituted or substituted in the cyclohexyl radical by from 1 to 3 methyl groups.

When $R_{14}$ is cycloalkylalkylcycloalkyl or arylalkylaryl, it is preferably $C_5$-$C_6$ cycloalkyl-methyl-$C_5$-$C_6$ cycloalkyl or phenylmethylphenyl, each of which may be unsubstituted or substituted in the cycloalkyl or phenyl ring by one or more methyl groups.

Suitable substituents on the ethylenically unsaturated $C_2$-$C_{24}$ radical Q are, for example, $C_1$-$C_4$ alkoxy, halogen, phenyl or carboxy.

Q is, for example, a radical of formula

(5)

wherein r is the number 0 or 1, each of $R_{16}$ and $R_{17}$ independently of the other is hydrogen, $C_1$-$C_4$ alkyl, phenyl, carboxy or halogen, $R_{18}$ is hydrogen, $C_1$-$C_4$ alkyl or halogen, and Z' is linear or branched $C_1$-$C_{12}$ alkylene or unsubstituted or $C_1$-$C_4$ alkyl- or $C_1$-$C_4$ alkoxy-substituted phenylene or $C_7$-$C_{12}$ aralkylene.

When Z' is a phenylene radical, it is, for example, unsubstituted or methyl- or methoxy-substituted 1,2-, 1,3- or 1,4-phenylene. Preferably, Z' as a phenylene radical is 1,3- or 1,4-phenylene.

When Z' is an aralkylene radical, it is, for example, unsubstituted or methyl- or methoxy-substituted benzylene, wherein the methylene group is bonded to the amine nitrogen in each case. Preferably, Z' as an aralkylene radical is the 1,3- or 1,4-phenylenemethylene radical, wherein the methylene group is bonded to the amine nitrogen —NH— in each case.

Z' is preferably unsubstituted or methyl- or methoxy-substituted phenylene or phenylenemethylene or $C_1$-$C_{12}$alkylene, more preferably 1,3- or 1,4-phenylene or $C_1$-$C_6$alkylene, especially $C_1$-$C_2$alkylene and most preferably methylene.

r is the number 1 or, preferably, the number 0.

$R_{18}$ is preferably hydrogen, methyl or chlorine and most preferably hydrogen or methyl.

Each of $R_{16}$ and $R_{17}$, independently of the other, is preferably hydrogen, carboxy, chlorine, methyl or phenyl. In a preferred embodiment of the invention, $R_{16}$ is hydrogen, chlorine, methyl or phenyl and $R_{17}$ is hydrogen or carboxy. Most preferably, $R_{16}$ and $R_{17}$ are each hydrogen.

Especially preferred radicals Q correspond to formula (5) wherein r is 0, $R_{18}$ is hydrogen or methyl, $R_{16}$ is hydrogen, methyl, chlorine or phenyl and $R_{17}$ is hydrogen or carboxy.

Other especially preferred radicals Q correspond to the above formula (5) wherein r is 1, Z' is 1,3- or 1,4-phenylene or $C_1$-$C_6$ alkylene, especially $C_1$-$C_2$ alkylene, $R_{18}$ is hydrogen or methyl and $R_{16}$ and $R_{17}$ are each hydrogen.

Examples of suitable radicals Q are vinyl, 2-propenyl, allyl, 2-butenyl, o-, m- or p-vinylphenyl, vinylphenyl, vinyl-naphthyl, allylphenyl, styryl, 2-carboxyvinyl, 2-chloro-2-carboxyvinyl, 1,2-dichloro-2-carboxyvinyl, 1,2-dimethyl-2-carboxyvinyl and 2-methyl-2-carboxyvinyl.

Examples of suitable ethylenically unsaturated amine are 2-(ter-butylamino)ethylmethacrylate (TBAM), and vinyl aniline.

The isocyanate-capped polyurethane polymers according to the invention may be produced by following a solventless process.

For example, in a solventless process, first one or more polyalkylene glycols of formula (1) (component (a)) is mixed with one or more branching agents (component (b)) and the mixture is heated to and maintained at a melting temperature or above. Then, at least one di- or polyisocyanate of formula (3) (component (c)) is added to the melted mixture to make a melted reaction mixture comprising component (a), component (b) and component (c) in a desired stoichiometry. The temperature of the melted reaction mixture is continuously and thoroughly stirred at the melting temperature or above and preferably under an inert atmosperic environment (for example, in nitrogen or argon atmosphere). Reaction is monitored by, for example, monitoring the isocyanate peak in FT-IR spectroscopy.

Components (a)-(c) are all known compounds or compound mixtures, or may be obtained in accordance with methods known per se.

It should be understood that components (a), (b), and (c) can be mixed together in a desired stoichiometry and the mixture then can be melted and maintained at a melting temperature or above to start reaction.

The stoichiometry of components (a), (b) and (c) in the melted reaction mixture is advantageously chosen so that the number of NCO equivalents of component (c) is greater than the sum of OH equivalents of components (a) and (b). Preferably, the stoichiometry of components (a), (b) and (c) in the melted reaction mixture is chosen so that the molar ratio of component (a) to component (b) to component (c) is about 4:1:7.

It should be further understood that the isocayanate-capped polyurethane polymers according to the invention may be produced by reacting components (a), (b), and (c) and optionally additional copolymerizable monomers in an inert solvent at a temperature of e.g. 30° C. to 150° C.

Suitable inert solvents are aprotic, preferably polar solvents, for example hydrocarbon halides (chloroform, methylene chloride, trichloroethane, tetrachloroethane, chlorobenzene), ethers (tetrahydrofuran, dioxane), ketones (acetone, ethyl methyl ketone, dibutyl ketone, methyl isobutyl ketone), carboxylic acid esters and lactones (ethyl acetate, butyrolactone, valerolactone), alkylated carboxylic acid amides (N,N-dimethylacetamide, N-methylpyrrolidone), nitriles (acetonitrile), sulphones and sulphoxides (dimethyl sulphoxide, tetramethylene sulphone). Polar solvents are preferably employed.

Furthermore, it is preferable for the reaction of the hydroxy-group-containing components (a) and (b) with the isocyanate-group-containing components (c) to be carried out in the presence of a catalyst, since the reaction time can be shortened. Suitable catalysts are for example metal salts such as alkali metal salts or tin salts of organic carboxylic acids, or tertiary amines, for example, $(C_1-C_6-alkyl)_3N$ (triethylamine, tri-n-butylamine), N-methylpyrrolidine, N-methylmorpholine, N,N-dimethylpiperidine, pyridine or 1,4-diaza-bicyclooctane. Tin salts have proved to be particularly effective, especially alkyl-tin salts of carboxylic acids, for example dibutyl tin dilaurate (DBTDL) and tin dioctoate.

The catalyst is employed in the reaction e.g. in a molar ratio of 1:10 to 1:1000, preferably 1:50 to 1:750, most preferably ca. 1:100 to 1:500, respectively based on component (a).

The reaction times may vary within a broad range, whereby progress of the reaction can be followed well by monitoring the reduction of the isocyanate content in the reaction mixture.

It is particularly preferred that the isocyanate-capped polyurethane polymers are produced in a solventless process. By using a solventless process, the production cost associated with solvent and its disposal can be eliminated.

Once the reaction of components (a) and (b) with component (c) is completed, the obtained isocyanate-capping polyurethane can be reacted directly with an ethylenically unsaturated amine (primary or secondary amine) and an ethylenically unsaturated monohydroxy compound, to prepare a vinyl group terminated polyurethane. Optionally, the obtained isocyanate-capping polyurethane can be purified prior to the reaction.

Isolation and purification of the vinyl group-terminated polyurethane are effected by known processes, for example extraction, crystallization, re-crystallization, ultrafiltration or by chromatographic purification methods. The compounds are obtained in high yields and with high purity.

The vinyl group-terminated polyurethanes according to the invention are radiation-curable, but uncrosslinked or at least substantially uncrosslinked; nevertheless, they are stable, i.e. spontaneous crosslinking due to homopolymerization does not take place substantially. The term "radiation-curable" in reference to a prepolymer means that the prepolymer can be crosslinked or polymerized by actinic radiation, including, for example, UV radiation, ionizing radiation such gamma radiation or X-rays, microwave, and the like.

The average molecular weight of the vinyl group-terminated polyurethanes according to the invention may vary within a broad range. An average molecular weight of e.g. 1000 to 50,000 has proved to be advantageous for the vinyl group-terminated polyurethanes according to the invention.

The above described isocyanate-capping polyurethane can also be used to prepared other non-crosslinkable polyurethanes, for example, by reacting with water, amine, or the like.

Another example of a copolymer as a modifier in accordance with the present invention can be a copolymerization product of at least one hydrophilic monomer and at least one hydrophobic monomers, wherein the homopolymer of said at least one hydrophilic monomer is miscible with the water-soluble polyvinyl alcohol having crosslinkable groups. Exemplary preferred hydrophilic monomers include, but are not limited to, hydroxy-substituted alkyl(meth)acrylates, N-vinyl-lactams, N,N-dialkyl-methacrylamides and vinylically unsaturated carboxylic acids with a total of 3 to 5 carbon atoms.

A N-vinyl lactam in accordance with the invention has a structure of formula (VI)

wherein
$R_{19}$ is an alkylene di-radical having from 2 to 8 carbon atoms,
$R_{20}$ is hydrogen, alkyl, aryl, aralkyl or alkaryl, preferably hydrogen or lower alkyl having up to 7 and, more preferably, up to 4 carbon atoms, such as, for example, methyl, ethyl or propyl; aryl having up to 10 carbon atoms, and also aralkyl or alkaryl having up to 14 carbon atoms; and
$R_{21}$ is hydrogen or lower alkyl having up to 7 and, more preferably, up to 4 carbon atoms, such as, for example, methyl, ethyl or propyl.

Examples of N-vinyl lactams corresponding to the above structural formula (VI) are N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam and N-vinyl-3,5,7-trimethyl-2-caprolactam.

A N-vinyl lactam according to the invention is preferably a heterocyclic monomer of formula (VI) containing preferably from 4 to 6 carbon atoms, more preferably 4 carbon atoms in the heterocyclic ring, wherein $R_{20}$ and $R_{21}$ are each independently of the other hydrogen or lower alkyl.

A N-vinyl lactam copolymer can be prepared by copolymerization of at least one N-vinyl lactam of formula (VI) with one or more hydrophobic monomer according to any method known to a person skilled in the art.

Where the hydrophilic monomer is a N,N-dialkyl-methacrylamide, alkyl is preferably methyl, ethyl, propyl, or butyl. N,N-dimethylacryamide is a more preferred embodiment of the hydrophilic monomer.

Where the hydrophilic monomer is a hydroxy-substituted alkyl(meth)acrylate, alkyl is preferably methyl, ethyl, propyl, or butyl.

Suitable hydrophobic monomers include, without limitation, $C_1$-$C_{18}$-alkylacrylates and -methacrylates, $C_3$-$C_{18}$ alkylacrylamides and -methacrylamides, acrylonitrile, methacrylonitrile, vinyl-$C_1$-$C_{18}$-alkanoates, $C_2$-$C_{18}$-alkenes, $C_2$-$C_{18}$-halo-alkenes, di-$C_1$-$C_7$ alkylamino-$C_1$-$C_7$ alkylacrylate, styrene, $C_1$-$C_6$-alkylstyrene, vinylalkylethers in which the alkyl moiety has 1 to 6 carbon atoms, $C_2$-$C_{10}$-perfluoroalkylacrylates and -methacrylates or correspondingly partially fluorinated acrylates and methacrylates, $C_3$-$C_{12}$-perfluoroalkyl-ethyl-thiocarbonylaminoethyl-acrylates and -methacrylates, acryloxy and methacryloxy-alkylsiloxanes, N-vinylcarbazole, $C_1$-$C_{12}$-alkylesters of maleic acid, fumaric acid, itaconic acid, mesaconic acid and the like. Preference is given e.g. to $C_1$-$C_4$-alkylesters of vinylically unsaturated carboxylic acids with 3 to 5 carbon atoms or vinylesters of carboxylic acids with up to 5 carbon atoms.

In another aspect, the present invention relates to a polymeric article which is a product of crosslinking of a polymerizable material of the invention (described-above) in the presence or preferably in the absence of one or more additional vinylic comonomers. The polymerizable material of the invention may be crosslinked in an extremely effective and well-directed manner upon actinic irradiation, in particular by UV irradiation. Crosslinking may take place in the presence or preferably in the absence of an additional vinylic comonomer. The resulting crosslinked polymers are insoluble in water, and preferably are substantially free of extractable chemicals.

A polymeric article according to the invention is an ophthalmic device, preferably a soft contact lens, more preferably a hydrogel contact lens.

In the case of photo-crosslinking, a photo-initiator is suitably added which can initiate radical crosslinking. Examples of these are familiar to the person skilled in the art, and suitable photo-initiators which may be mentioned in particular are benzoin-methylether, 1-hydroxy-cyclo-hexyl-phenylketone, Darocure® 1173 or Irgacuree® types. Crosslinking may be commenced by actinic radiation, e.g. UV light, or by ionized radiation, e.g. gamma rays or X-rays.

Photo-crosslinking is preferably effected directly from an aqueous solution of a polymerizable material of the invention, which may be obtained as the result of the preferred purification step, ultrafiltration. For example, photo-crosslinking may be undertaken from a 15 to 90% aqueous solution.

The process for the production of polymeric articles according to the invention comprises radiation-crosslinking an aqueous solution of a polymerizable material of the invention, the aqueous solution comprising preferably a photoinitiator and optionally a vinylic monomer.

The vinylic monomer which may be additionally used for photo-crosslinking in accordance with the invention may be hydrophilic, hydrophobic or may be a mixture of a hydrophobic and a hydrophilic vinylic monomers. Suitable vinylic monomers include especially those normally used for the manufacture of contact lenses. A "hydrophilic vinylic monomer" refers to a monomer which as a homopolymer typically yields a polymer that is water-soluble or can absorb at least 10 percent by weight water.

The process according to the invention for molding a polymerizable material into ophthalmic devices, especially contact lenses, may take place in a manner known to a person skilled in the art, for example, photo-crosslinking of the polymerizable material in an appropriate contact lens mold. Further examples of molded articles according to the invention, apart from contact lenses, are e.g. intra-ocular lenses or eye dressings, furthermore biomedical articles which may be used in surgery, such as heart valves, artificial arteries or the like, also films or membranes, e.g. membranes for diffusion control, photo-structurable films for data storage, or photo resist materials, e.g. membranes or molded articles for etch resist printing or screen resist printing.

In another further aspect, the present invention provides a method for producing an ophthalmic device, the method comprising the steps of: a) introducing an aqueous solution of an above-described polymerizable material of the invention, in the presence or preferably in the absence of one or more additional vinylic comonomers, and optionally in the presence of a photo-initiator, into a mold; b) crosslinking by actinic radiation the polymerizable material, and c) opening the mold so that the ophthalmic device can be removed from the mold.

The polymerizable material solution may be introduced into a mold according to any suitable method known to a person skilled in the art, especially conventional dispensing, e.g. dropwise addition. If vinylic monomers are present, the vinylic monomers are advantageously mixed first with the polymerizable material and then introduced into the mold.

Appropriate disposable molds are made, for example, from polypropylene. Suitable materials for re-usable moulds are e.g. quartz, sapphire glass or metals.

If the molded articles to be produced are contact lenses, these may be produced in a manner known to a person skilled in the art, e.g. in a conventional "spin-casting mold", as described for example in U.S. Pat. No. 3,408,429, or by the so-called full mold process in a static form, as described e.g. in U.S. Pat. Nos. 4,347,198, 5,508,317, 5,583,463, 5,789,464, and 5,849,810.

Crosslinking may be initiated in the mold e.g. by means of actinic radiation, such as UV irradiation, ionizing radiation (e.g., gamma or X-ray irradiation).

As already mentioned, photo-crosslinking is advantageously carried out in the presence of a photo-initiator which can initiate radical crosslinking. The photo-initiator is advantageously added to the prepolymers according to the invention prior to introducing them into the mold, preferably by mixing the polymers and the photo-initiator together. The amount of photo-initiator may be selected from a wide range, whereby an amount of up to 0.05 g/g polymer and especially up to 0.003 g/g polymer has proved favorable.

What is notable is that the crosslinking according to the invention may be effected in a very short time, e.g. in $\leq 60$ minutes, advantageously in $\leq 20$ minutes, preferably in $\leq 10$ minutes, most preferably in $\leq 5$ minutes, particularly preferably in 1 to 60 seconds and most particularly in 1 to 30 seconds.

What is also notable is that the contact lenses according to the invention can be produced from a polymerizable material in a very simple and efficient way compared with the prior art. Since the components of a polymerizable material can be purified prior to aqueous solution preparation, no subsequent purification, such as in particular complicated extraction of unpolymerized constituents is needed after crosslinking. In addition, since crosslinking is carried out in an essentially aqueous solution, a subsequent solvent exchange or the hydration step is not necessary. Finally, photo-polymerization is effected within a short period.

Opening of the mold and removing of the molded article therefrom can be carried out according to any suitable methods known to a person skilled in the art.

Contact lenses obtained from a polymerizable material of the invention can have various advantageous properties which are possesed by contact lenses made from crosslinakble PVA. Exemplary properties include, without limitation, excellent compatibility with the human cornea, a well-balanced relationship between water content, oxygen permeability and good mechanical properties, high resistance to shape changes (even after autoclaving e.g. at about 120° C.). Furthermore, contact lenses obtained from a polymerizable material of the invention can also have one or more improved physical properties including stress at break (N/mm$^2$), percentage of elongation at break, toughness or energy to break (N·mm), and susceptibility to fracture.

In still a further aspect, the present invention provides a method for modifying one or more physical properties of a hydrogel article obtained from the polymerization of a crosslinkable polymer, the method comprising the steps of: adding, into a solution of said crosslinkable polymer, a modifier in an amount sufficient to modify said one or more physical properties of said polymeric article, wherein said modifier is selected from the group consisting of nanoparticles having a hydrophilic surface, a copolymer having hydrophobic groups or units for imparting at least one desired physical property to said hydrogel article and hydrophilic groups or units in an amount sufficient to render it miscible with the crosslinkable polymer, and mixtures thereof; mixing thoroughly said modifier and the crosslinkable polymer; and crosslinking said crosslinkable polymer in the presence of the modifier to obtain said hydrogel article, wherein the one or more physical properties are selected from the group consisting of stress at break (N/mm$^2$), percentage of elongation at break, toughness or energy to break (N·mm), and susceptibility to fracture.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

General Procedures

Susceptibility to fracture or Pin Hole Test are carried out as follows: Lenses are punctured with a 22 gauge needle, folded in half and then rolled 2-3 times between fingers. If a lens does not fracture, it is given a "Pass" rating.

The water contents (%) of contact lenses are measured using an ATAGO CL-1 Refractometer or an ATAGO N2-E Refractometer.

Tensile properties (stress at break, elongation at break, modulus, and toughness) are measured using MTS Tester or equivalent and load Cell 5N, Class 0.5 or equivalent, with a strain rate of 100 mm/minute.

Nelfilcon (CIBA Vision) is used in the following examples as a water-soluble crosslinkable polyvinyl alcohol to be blended with one or more modifiers. Unless otherwise stated, an aqueous solution of nelfilcon, containing 30% by weight of nelfilcon, 0.5% by weight of Poloxamer 108, and 0.095% by weight of Irgacure 2959, is used to prepared a polymerizable material of the invention for making contact lenses.

Design of experiment and analysis of experimental results are performed by using Design-Expert, version, 6.0.0.

Example 2

Vinyl pyrrolidone/vinyl acetate copolymers are obtained from International Specialty Products. Copolymers with two different grades are obtained. One grade is W-635 and has a molecular weight of about 15,000 and is an aqueous solution containing 50% by weight of copolymer. The other grade is S-630 and has a molecular weight of about 51,000 and is a dry powder.

The above two vinyl pyrrolidone/vinyl acetate copolymers are blended with nelfilcon to prepare a series of samples for making contact lenses according to a D-Optimal crossed mixture design with 22 points. The composition of each sample is listed in Table 1. Sample preparation is described as follows. Nelfilcon aqueous solution (Example 1) is weighed in a capped vial. A vinyl pyrrolidone/vinyl acetate copolymer is weighed in another vial and then deionized water is added to the vial to dissolve the copolymer. The copolymer solution is added to the nelfilcon vial and mixed thoroughly. Both vinyl pyrrolidone/vinyl acetate copolymers are soluble in all mixtures. The aqueous solution of the vinyl pyrrolidone/vinyl acetate copolymer is added to the nelfilcon and mixed. All solutions are clear.

Contact lenses are made from the above-prepared aqueous solution by using plastic contact lens molds capable of casting a fully formed contact lens. Poly(propylene) molds are filled with the appropriate amount of aqueous monomer solution. The molds containing the aqueous solution are cured by UV irradiation (2.5 mW/cm$^2$) for 10 seconds. Lenses are removed from the molds, placed in glass vials containing isotonic borate buffered saline (saline solution contained 0.005% Poloxamer) and then sterilized. Lens properties are reported in Table 1.

Experimental results are analyzed using Design-Expert, version, 6.0.0. It is found that stress at break (SatB) and elongation at break (EatB) increase as the concentration of copolymer increases and the modulus decreases as the concentration of the copolymer increases. The following equations are obtained in terms of actual components.

$$SatB = 0.009451*(nelfilcon) - 0.02778*(water) + 0.015882*(copolymer)$$

$$Modulus = 0.00525*(nelfilcon) - 0.00579*(water) - 0.00319*(copolymer)$$

$$EatB = 2.242543*(nelfilcon) - 4.11372*(water) + 8.844298*(copolymer)$$

The SatB and EatB values at zero percent added copolymer are essentially for the base control polymer and can be determined by substituting zero for the appropriate terms in these equations. It can be seen that adding copolymer with minimal water increases the values of these key polymer performance indicators.

TABLE 1

| Sample No. | Nelfilcon (Wt. Fr.) | Polymer (Wt. Fr.) | Water (Wt. Fr.) | Copolymer Type | Stress At Break (N/mm$^2$) | Modulus (N/mm$^2$) | Elong. At Beak (%) |
|---|---|---|---|---|---|---|---|
| 1 | 0.8860 | 0.0102 | 0.1038 | W-635 | 0.607 | 0.390 | 132 |
| 2 | 0.8881 | 0.0102 | 0.1017 | S-630 | 0.512 | 0.366 | 139 |
| 3 | 0.7212 | 0.0992 | 0.1796 | W-635 | 0.274 | 0.220 | 158 |

TABLE 1-continued

| Sample No. | Nelfilcon (Wt. Fr.) | Polymer (Wt. Fr.) | Water (Wt. Fr.) | Copolymer Type | Stress At Break (N/mm²) | Modulus (N/mm²) | Elong. At Beak (%) |
|---|---|---|---|---|---|---|---|
| 4 | 0.7278 | 0.0989 | 0.1733 | S-630 | 0.218 | 0.187 | 169 |
| 5 | 0.7945 | 0.1017 | 0.1038 | W-635 | 0.436 | 0.320 | 253 |
| 6 | 0.7998 | 0.0992 | 0.1010 | S-630 | 0.532 | 0.348 | 297 |
| 7 | 0.8144 | 0.0101 | 0.1755 | W-635 | 0.380 | 0.316 | 168 |
| 8 | 0.8136 | 0.0101 | 0.1763 | S-630 | 0.366 | 0.319 | 168 |
| 9 | 0.8339 | 0.0585 | 0.1076 | W-635 | 0.529 | 0.388 | 154 |
| 10 | 0.8431 | 0.0557 | 0.1012 | S-630 | 0.890 | 0.364 | 258 |
| 11 | 0.7840 | 0.0767 | 0.1393 | S-630 | 0.496 | 0.309 | 161 |
| 12 | 0.8517 | 0.0100 | 0.1383 | W-635 | 0.455 | 0.372 | 263 |
| 13 | 0.7687 | 0.0551 | 0.1762 | W-635 | 0.344 | 0.324 | 96 |
| 14 | 0.8047 | 0.0479 | 0.1474 | W-635 | 0.586 | 0.342 | 165 |
| 15 | 0.7580 | 0.0870 | 0.1550 | W-635 | 0.618 | 0.289 | 292 |
| 16 | 0.8480 | 0.0103 | 0.1417 | S-630 | 0.225 | 0.346 | 60 |
| 17 | 0.7687 | 0.0551 | 0.1762 | S-630 | 0.324 | 0.301 | 113 |
| 18 | 0.7946 | 0.1026 | 0.1028 | S-630 | 0.611 | 0.323 | 170 |
| 19 | 0.7242 | 0.1003 | 0.1755 | S-630 | 0.400 | 0.290 | 158 |
| 20 | 0.8886 | 0.0100 | 0.1014 | W-635 | 0.803 | 0.477 | 208 |
| 21 | 0.7866 | 0.1059 | 0.1075 | W-635 | 0.856 | 0.331 | 210 |
| 22 | 0.8900 | 0.0099 | 0.1001 | S-630 | 0.280 | 0.372 | 104 |

Example 3

Two grades, D1 and T5, of dextran are obtained from Amersham Pharmacia Biotech. D1 grade of dextran has a molecular weight of about 1000 and T5 grade of dextran has a molecular weight of about 5000.

The above two grades of dextran are blended with nelfilcon to prepare a series of samples for making contact lenses according to a mixed D-Optimal mixture design with 17 points. The composition of each of the samples is listed in Table 2. Sample preparation is the same as described in Example 2. Some solutions (samples 6, 10, 11, and 17-19) are cloudy and the rest solutions are clear.

TABLE 2

| | Composition (Wt. Fraction) | | | |
|---|---|---|---|---|
| Sample No. | Nelfilcon | Water | Dextran | Dextran type |
| 1 | 0.8800 | 0.1091 | 0.0109 | D1 |
| 2 | 0.8897 | 0.1003 | 0.0100 | T5 |
| 3 | 0.7238 | 0.1772 | 0.0990 | D1 |
| 4 | 0.7220 | 0.1771 | 0.1009 | T5 |
| 5 | 0.7948 | 0.1034 | 0.1018 | D1 |
| 6 | 0.7910 | 0.1045 | 0.1045 | T5 |
| 7 | 0.8111 | 0.1787 | 0.0102 | D1 |
| 8 | 0.8105 | 0.1793 | 0.0102 | T5 |
| 9 | 0.8432 | 0.1014 | 0.0554 | D1 |
| 10 | 0.8404 | 0.1033 | 0.0563 | T5 |
| 11 | 0.7828 | 0.1389 | 0.0783 | T5 |
| 12 | 0.8506 | 0.1392 | 0.0102 | D1 |
| 13 | 0.7402 | 0.1979 | 0.0619 | D1 |
| 14 | 0.8077 | 0.1374 | 0.0549 | D1 |
| 15 | 0.7607 | 0.1386 | 0.1007 | D1 |
| 16 | 0.8530 | 0.1385 | 0.0085 | T5 |
| 17 | 0.7661 | 0.1789 | 0.0550 | T5 |
| 18 | 0.7912 | 0.1054 | 0.1034 | T5 |
| 19 | 0.7218 | 0.1809 | 0.0973 | T5 |
| 20 | 0.8860 | 0.1037 | 0.0103 | D1 |
| 21 | 0.7884 | 0.1062 | 0.1054 | D1 |
| 22 | 0.8875 | 0.1023 | 0.0102 | T5 |

Contact lenses are prepared from the above-prepared aqueous solution in the same manner descried in example 2. Lenses are removed from the molds, placed in glass vials containing isotonic borate buffered saline (saline solution contained 0.005% poloxomer) and then sterilized. Lens properties are reported in Table 3.

Experimental results are analyzed using Design-Expert, version, 6.0.0. Analysis of data indicates that physical properties of contact lenses made from nelfilcon can be modified to some minor extent by blending nelfilcon with dextran.

TABLE 3

| Sample No. | Lens Clarity (Visual) | Lens Clarity (Measured) | Stress at Break (N/mm²) | Elong. at Break (%) | Modulus (N/mm²) |
|---|---|---|---|---|---|
| 1 | Clear | 0.20 | 0.243 | 87 | 0.288 |
| 2 | Clear | 0.28 | 0.303 | 82 | 0.344 |
| 3 | Clear | 0.10 | 0.115 | 60 | 0.099 |
| 4 | Cloudy | 25.77 | 0.192 | 67 | 0.165 |
| 5 | Clear | 0.10 | 0.177 | 78 | 0.152 |
| 6 | Cloudy | 34.20 | 0.113 | 36 | |
| 7 | Clear | 0.19 | 0.159 | 58 | 0.246 |
| 8 | Clear | 0.05 | 0.126 | 40 | |
| 9 | Clear | 0.16 | 0.340 | 113 | 0.261 |
| 10 | Cloudy | 34.60 | 0.268 | 83 | 0.197 |
| 11 | Cloudy | 34.10 | 0.055 | 24 | |
| 12 | Clear | 0.33 | 0.383 | 144 | 0.234 |
| 13 | Clear | 0.52 | 0.359 | 154 | 0.227 |
| 14 | Clear | 0.43 | 0.986 | 253 | 0.349 |
| 15 | Clear | 0.09 | 0.492 | 134 | 0.279 |
| 16 | Clear | 0.16 | 0.789 | 152 | 0.450 |
| 17 | Cloudy | 29.80 | 0.480 | 92 | 0.437 |
| 18 | Cloudy | 28.40 | 0.486 | 76 | 0.603 |
| 19 | Cloudy | 25.50 | 0.746 | 122 | 0.567 |
| 20 | Clear | 0.41 | 0.777 | 192 | 0.423 |
| 21 | Clear | 0.27 | 0.488 | 107 | 0.382 |
| 22 | Clear | 1.23 | 0.691 | 132 | 0.465 |

Example 4

Preparation of Vinyl-Substituted Vinyl Pyrrolidone/Acrylate Copolymers

Synthesis of Poly(NVP/GMA/MMA/BA). A 3-neck flask fitted with a balloon, paddle stirrer, gas inlet/outlet valves is charged N-vinylpyrrolidone (NVP) (23.845 g), glycidylemethacrylate (GMA) (8.229 g), butylacrylate (BA) (4.041 g), methylmethacrylate (MMA) (2.252 g), vazo-52 (0.2051 g) and 325 mL of toluene. The flask is filled with nitrogen until the attached 9 inch capacity balloon on the reaction flask is filled. Vacuum is then applied until the balloon collapsed and the reaction mixture just began to bubble. This operation is repeated about five times and then the reaction mixture is blanketed with nitrogen. The reaction mixture is heated at 55° C. under nitrogen for about 20 hours. Approximately 0.5 mL of reaction mixture is poured into about 10 mL of hexanes and about 20 mg of the resulting precipitate is dissolved in chloroform and then cast onto a NaCl disk. The resulting film is dried at about 60° C. for 5 minutes and then analyzed by FT-IR. Selected peaks: 2957, 2929, 2873, 1729, 1685, 1460, 1423, 1285, 1270, 1170, 994 $cm^{-1}$.

Conversion of Poly(NVP/GMA/MMA/BA) to a Photo-Curable Copolymer. Approximately 350 mL of toluene solution containing a calculated 35 grams of the obtained poly(DMA/GMA/BEA/MMA) is combined with DABCO (2.166 grams), 4-methoxyphenol (0.518 grams), and 350 mL of toluene. The reaction mixture is then heated to about 65° C. and then methacrylic acid (48/0.10 g) is added. The reaction mixture is then heated to about 80° C. for about 30 hours. The resulting photo-curable copolymer is isolated by pouring the reaction mixture into about 1500 mL of hexanes. The precipitated copolymer is dissolved in THF and reprecipitated in hexanes and then dried for a few days in a vacuum oven. Approximately 20 mg of sample is dissolved in about 0.5 mL of chloroform and then a film is cast onto a NaCl disk. The film is dried at about 50° C. for 10 minutes. FT-IR analysis showed characteristic ester and amide CO peaks near 1726 and 1643 $cm^{-1}$ respectively. In addition, FT-IR showed a broad OH peak near 3342, and a peak characteristic of C=C near 1566 $cm^{-1}$.

The vinyl-substituted vinyl pyrrolidone/acrylate copolymers are blended with nelfilcon to prepare a series of samples for making contact lenses according to a D-Optimal mixture design with 14 points. The composition of each of the samples is listed in Table 4. Sample preparation is described as follows. Nelfilcon aqueous solution is weighed in a capped vial. A vinyl-substituted vinyl pyrrolidone/acrylate copolymer is weighed in another vial and then deionized water added in the vial to dissolve the copolymer. The copolymer solution is added to the nelfilcon vial and mixed thoroughly. All solutions are clear except for the brown color imparted by the vinyl-substituted vinyl pyrrolidone/acrylate copolymer.

TABLE 4

| | Composition (Wt. Fraction) | | |
|---|---|---|---|
| Sample No. | Nelfilcon | Water | NVP copolymer |
| 1 | 0.5039 | 0.2992 | 0.1969 |
| 2 | 0.3007 | 0.4998 | 0.1995 |
| 3 | 0.4852 | 0.3931 | 0.1217 |
| 4 | 0.5500 | 0.4001 | 0.0499 |
| 5 | 0.4552 | 0.4953 | 0.0495 |
| 6 | 0.6514 | 0.2991 | 0.0495 |
| 7 | 0.4090 | 0.4353 | 0.1557 |
| 8 | 0.5748 | 0.3002 | 0.1250 |
| 9 | 0.5317 | 0.3463 | 0.1220 |
| 10 | 0.4124 | 0.3923 | 0.1953 |
| 11 | 0.4500 | 0.4996 | 0.0504 |
| 12 | 0.3642 | 0.4552 | 0.1806 |
| 13 | 0.5018 | 0.2997 | 0.1985 |
| 14 | 0.6521 | 0.2987 | 0.0492 |

Contact lenses are prepared from the above-prepared aqueous solution by methods described in Example 2. Lenses are removed from the molds, placed in glass vials containing isotonic borate buffered saline (saline solution contained 0.005% poloxomer) and then sterilized. Lens properties are reported in Table 5.

TABLE 5

| Sample No. | Stress at Break (N/mm$^2$) | Modulus (N/mm$^2$) | Elong. At Break (%) | Max. Break Stress. (N/mm$^2$) | Max. Elong. At Break (%) | Lens Clarity[1] |
|---|---|---|---|---|---|---|
| 1 | 1.931 | 1.391 | 135 | 2.533 | 172 | 2 |
| 2 | 0.558 | 0.915 | 62 | 0.992 | 90 | 3 |
| 3 | 1.297 | 0.904 | 172 | 2.309 | 226 | 2 |
| 4 | 0.173 | | 37 | 0.249 | 63 | 1 |
| 5 | 0.259 | 0.244 | 81 | 0.370 | 118 | 1 |
| 6 | 0.370 | 0.535 | 72 | 0.643 | 131 | 1 |
| 7 | 0.906 | 0.676 | 102 | 1.675 | 179 | 2 |
| 8 | 1.671 | 0.927 | 149 | 2.895 | 182 | 1 |
| 9 | 1.461 | 0.988 | 125 | 2.439 | 190 | 2 |
| 10 | 0.948 | 1.069 | 83 | 1.421 | 120 | 2 |
| 11 | 0.167 | | 48 | 0.219 | 59 | 1 |
| 12 | 1.279 | 0.981 | 121 | 1.706 | 157 | 3 |
| 13 | 2.010 | 1.327 | 140 | 2.800 | 190 | 3 |
| 14 | 0.804 | 0.627 | 114 | 1.881 | 246 | 1 |

[1]subjective scale: 1 = clear; 2 = slight haze; 3 = hazy

Experimental results are analyzed using Design-Expert, version, 6.0.0. It is found that stress at break (SatB), elongation at break (EatB), and modulus increase as the concentration of copolymer increases. Lens clarity improves as the amount of vinyl-substituted vinyl pyrrolidone/acrylate copolymer decreases. This is probably due to the fact that vinyl pyrrolidone is not purified before making vinyl-substituted vinyl pyrrolidone/acrylate copolymer and the vinyl-substituted vinyl pyrrolidone/acrylate copolymer is brown in color. The following equations are obtained in terms of actual components:

$$SatB = -0.001012*A - 0.00381423*B + 0.015882*C + 0.00298A*C$$

$$Modulus = 0.009907*A - 0.010313*B - 0.057295*C$$

$$EatB = 1.588316*A - 66.03316*B - 4.128813*C$$

wherein A, B, and C are nelfilcon, water, and copolymer respectively. The lens properties with pure nelfilcon can be calculated by substituting zero in the equations for water and copolymer. It can be seen that SatB increases as the water and copolymer are added to the monomer mixture.

Example 5

Nano-size silica fillers (particles), Aerosil 0X50 and Aerosil 200, are supplied by Degussa. Aerosil 0X50 has an averaged particle size of about 40 nm and Aerosil 200 has an averaged particle size of about 12 nm.

A series of samples is prepared as follows. Nelfilcon aqueous solution is weighed in a capped vial. Nano-size silica fillers are weighed in another vial and then weighed amount of nelfilcon is added. The mixture is stirred and centrifuged at 4000 rpm for 15 minutes. The composition of each of the samples is listed in Table 6.

TABLE 6

| Sample No. | Composition (Wt. Fraction) | | | Observations after centfifuging* |
|---|---|---|---|---|
| | Nelfilcon | Aerosil 200 | Aerosil 0X50 | |
| 1 | 0.9502 | 0.0498 | | Large amount of precipitate |
| 2 | 0.9001 | 0.0999 | | Too thick to centrifuge |
| 3 | 0.9317 | | 0.0683 | Large amount of precipitate |
| 4 | 0.9010 | | 0.0990 | Large amount of precipitate |
| 5 | 1.0000 | | | |
| 6 | 0.9974 | 0.0026 | | No precipitate |
| 7 | 0.9946 | 0.0054 | | Very small precipitate |
| 8 | 0.9984 | | 0.0016 | Very small precipitate |
| 9 | 0.9953 | | 0.0047 | Very small precipitate |

*15 minutes at 4000 rpm

Contact lenses are prepared from the above-prepared aqueous solutions from Nos. 5-9 using methods described in Example 2 except that the UV irradiance used 1.9 mWcm$^{-2}$. Lens properties are reported in Table 7. Lens physical properties such at break, elongation at break increase with the addition of fillers. Lens modulus to be independent of the presence of fillers. Susceptibility to fracture (or Pin Hole Test) can be improved by blending fillers with nelfilcon.

TABLE 7

| Sample No. | Stress at Break (N/mm$^2$) | Modulus (N/mm$^2$) | Elong. At Break (%) | Max. Stress at Break (N/mm$^2$) | Max. Elong. At Break (%) | Pin Hole Test* |
|---|---|---|---|---|---|---|
| 5 | 1.778 (1.146) | 0.789 (0.094) | 206 (130) | 2.423 | 424 | 1 |
| 6 | 2.319 (2.623) | 0.815 (0.052) | 343 (74) | 2.623 | 393 | 4 |
| 7 | 2.958 (0.706) | 0.809 (0.085) | 345 (42) | 3.974 | 404 | 4 |
| 8 | 2.047 (0.255) | 0.783 (0.075) | 337 (76) | 2.255 | 460 | 4 |

TABLE 7-continued

| Sample No. | Stress at Break (N/mm$^2$) | Modulus (N/mm$^2$) | Elong. At Break (%) | Max. Stress at Break (N/mm$^2$) | Max. Elong. At Break (%) | Pin Hole Test* |
|---|---|---|---|---|---|---|
| 9 | 1.714 (2.217) | 0.847 (0.034) | 212 (128) | 2.670 | 372 | 4 |

Numbers in the parenthesis are standard deviations

*Pin Hole Test is performed after autoclaving by puncturing lens center with a needle and folding it over on itself; 1 = fail, 5 = pass.

Example 6

Two copolymers, GANEX P-904LC and GAFFIX VC-713, are supplied by International Specialty Products. GANEX P-904LC is an aqueous solution containing 30% (w/w) of a copolymer of N-vinyl pyrrolidone (90%) and the $C_4$ a olefin 1-butene (10%). GAFFIX VC-713 is a solution (in ethanol) containing 70% (w/w) of a copolymer of N-vinyl pyrrolidone, N-vinyl caprolactone, and dimethylaminoethyl methacrylate.

The above two copolymers are blended with nelfilcon to prepare a series of samples for making contact lenses. The composition of each of the samples is listed in Table 8. Sample preparation is described as follows. Nelfilcon aqueous solution is weighed in a capped vial. A copolymer is weighed in another vial and then added to the nelfilcon vial and mixed thoroughly.

TABLE 8

| Sample No. 1156-95- | Nelfilcon (Wt. Fr.) | P904LC* (Wt. Fr.) | VC-713 (Wt. Fr.) |
|---|---|---|---|
| 1 | 0.9533 | 0.0467 | |
| 2 | 0.9012 | 0.0988 | |
| 3 | 0.8505 | 0.1495 | |
| 4 | 0.9504 | | 0.0496 |
| 5 | 0.8999 | | 0.1001 |
| 6 | 0.8510 | | 0.1490 |
| Control* | 1.0000 | | |

Focus Dailies lot 1158643

Contact lenses are prepared from the above-prepared aqueous solution by methods described in Example 2 except the monomer solution is irradiated with UV radiation at 2.5 mWcm$^{-2}$. Lenses are removed from the molds and placed in glass vials containing isotonic borate buffered saline (saline solution contained 0.005% poloxomer) and then sterilized by autoclave.

Lens properties are reported in Table 9. Lens modulus decreases with increasing concentration of copolymer (VC-713 or P904-LC). The energy to break (toughness) of all lenses made from the blends is increased significantly over those of control lenses. Other physical properties (such as peak stress and elongation at break) of lenses made from the blends are statistically significantly better than those of control lenses.

TABLE 9

| Sample No. | Peak Stress (N/mm$^2$) | Modulus (N/mm$^2$) | Elongation At Break % | Energy to Break (N * mm) | Diameter (mm) | Center Thickness (mm) |
|---|---|---|---|---|---|---|
| 1 | 1.439 | 0.531 | 474 | 17.596 | 13.95 | 0.185 |
| 2 | 1.485 | 0.443 | 424 | 14.327 | 14.00 | 0.182 |
| 3 | 1.424 | 0.391 | 471 | 14.893 | 13.91 | 0.179 |
| 4 | 1.766 | 0.513 | 386 | 14.575 | 13.97 | 0.182 |
| 5 | 1.719 | 0.451 | 369 | 12.947 | 14.01 | 0.180 |
| 6 | 2.053 | 0.456 | 386 | 15.150 | 14.02 | 0.180 |
| Control | 0.563 | 0.313 | 304 | 4.819 | 13.80 | 0.200 |

Control is 100% nelfilcon lens

Example 7

A copolymer, GANEX P-904LC, is supplied by International Specialty Products. GANEX P-904LC is an aqueous solution containing 30% (w/w) of a copolymer of N-vinyl pyrrolidone (90%) and the C$_4$ α olefin 1-butene (10%).

The compositions of the samples are listed in Table 10 and are prepared as described in Example 6.

TABLE 10

| | Composition (Wt. Fraction) | |
|---|---|---|
| Sample No. | Nelfilcon | P-904LC |
| 1 | 0.8499 | 0.1501 |
| 2 | 0.9484 | 0.0516 |
| 3 | 0.8995 | 0.1005 |
| 4 | 0.8475 | 0.1525 |
| Control* | | |

Focus Dailies, lot 2064670, target power = −3.00

Contact lenses are prepared from the polymerizable compositions. Lenses are prepared by methods described in Example 2. Monomer in the molds containing the aqueous solution is cured by UV irradiation (2.2 mW/cm$^2$) (for a total of 9 seconds). Mold halves containing lenses are placed in deionized water to soak for several seconds and then lenses are removed from the molds and placed in glass vials containing isotonic borate buffered saline (saline solution contained 0.005% poloxomer) and then sterilized by autoclave.

Extraction studies are carried out as follows. Each lens is placed in 2.6 g of buffered saline and autoclaved. The saline in which the lenses are autoclaved is tested for NVP/1-butene copolymer. In a separate experiment, the lenses are extracted in saline and then the saline is tested for the presence of the NVP/1-butene copolymer. The limit of detection is 50 ppm. It is found that NVP/1-butene copolymer is not extracted from the lenses either in the autoclave or in a separate saline extraction experiment.

Lens properties are reported in Table 11. The data in Table 11 indicate that the NVP/1-butene copolymer improves the physical properties (peak stress, elongation at break and toughness of Focus Dailies lenses. It appears that the presence of the hydrophobic component (1-butene) may play an important role in improving physical properties of lenses. It is also technologically meaningful that the blended copolymer does not extract from the nelfilcon even though there is no apparent chemical bonding of the nelfilcon with the copolymer.

TABLE 11

| Sample No. | Peak Stress (N/mm$^2$) | Modulus (N/mm$^2$) | Toughness (N * mm) | Elong. At Break (%) | Diameter (mm) | Center Thickness (mm) | Water (%) |
|---|---|---|---|---|---|---|---|
| 1 | 1.096 | 0.406 | 12.025 | 391 | 13.79 | 0.210 | |
| 2 | | | | | | | 70.3 |
| 3 | | | | | | | 74.1 |
| 4 | | | | | | | 76.9 |
| Control* | 0.835 | 0.486 | 5.847 | 251 | 13.80 | 0.200 | 70.0 |

Example 8

Preparation of DMA Copolymer: Poly(DMA/GMA/BEA/MMA)

Vinyl-substituted Poly(DMA) is prepared by polymerizing N,N-dimethylacrylamide (DMA) with glycidyl methacrylate (GMA), methyl methacrylate (MMA), and 2-butoxyethylate-acrylate (BEA). A 3-neck flask fitted with a balloon, paddle stirrer, gas inlet/outlet valves is charged DMA (23.845 g), GMA (8.036 g), BEA (6.031 g), MMA (2.029 g), vazo-52 (0.2041 g) and 325 mL of toluene. The flask is filled with nitrogen until the attached 9 inch capacity balloon on the reaction flask is filled. Vacuum is then applied until the balloon collapsed and the reaction mixture just began to bubble. This operation is repeated about five times and then the reaction mixture is blanketed with nitrogen. The reaction mixture is heated at 55° C. under nitrogen for about 20 hours. The reaction mixture volume is then adjusted to 400 mL by the addition of toluene and then approximately 50 mL of the reaction mixture is poured into 150 mL of hexanes. The resulting precipitate of Poly(DMA/GMA/BEA/MMA) is dried under vacuum at about 35-40° C. for about one day. About 20 mg of the dried sample is dissolved in about 0.5 mL of chloroform, cast onto a NaCl disk, and dried at about 50° C. for about 10 minutes and then analyzed by FT-IR. Selected peaks: 2932, 2871, 1728, 1642, 1496, 1398, 1355, 1257, 1134, 993 cm$^{-1}$.

Conversion of Poly(DMA/GMA/BEA/MMA) to a Photo-Curable Copolymer

Approximately 350 mL of toluene solution containing a calculated 35 grams of the obtained poly(DMA/GMA/BEA/MMA) is combined with DABCO (2.11 grams), 4-methoxyphenol (0.509 grams), and 850 mL of toluene. The reaction mixture is then heated to about 65° C. and then methacrylic acid (48.1 g) is added. The reaction mixture is then heated to about 80° C. for about 30 hours. The resulting photo-curable copolymer is isolated by pouring the reaction mixture into about 1500 mL of hexanes. The precipitated copolymer is dissolved in THF and reprecipitated in hexanes and then dried for a few days in a vacuum oven. Approximately 20 mg of sample is dissolved in about 0.5 mL of chloroform and then a film is cast onto a NaCl disk. The film is dried at about 50° C. f or 10 minutes. FT-IR analysis showed characteristic ester and amide CO peaks near 1726 and 1643 cm$^{-1}$ respectively.

In addition, FT-IR showed a broad OH peak near 3350, and a peak characteristic of C=C near 1510 cm$^{-1}$ A 30 weight percent solution of the copolymer in water containing 0.033 weight percent Irgacure 2959 had viscosity of 588 cps at 25° C. Contact lenses with water content of about 79 percent are obtained by photo-curing this solution at about 2.5 mW/cm$^2$ for 20 seconds.

Lens Preparation

The above obtained vinyl-substituted DMA copolymer is blended with nelfilcon to prepare a series of samples for making contact lenses according to a D-Optimal crossed mixture design with 14 points. The composition of each of samples is listed in Table 12. Sample preparation is described as follows. Nelfilcon aqueous solution is weighed in a capped vial. The vinyl-substituted DMA copolymer is weighed in another vial and then deionized water is added in the vial to dissolve the DMA copolymer. The DMA copolymer solution is added to the nelficon vial and mixed thoroughly. A clear aqueous solution is obtained.

Contact lenses are prepared from the above-prepared aqueous solution according to procedures given in Example 2 except that the monomer solutions are irradiated with UV radiation at 2.5 mWcm$^{-2}$. Lenses are removed from the molds, placed in glass vials containing isotonic borate buffered saline (saline solution contained 0.005% poloxomer) and then sterilized.

Lens properties are reported in Table 12. It appears that there is no statistically significant model that can be used to interpret the results. The DMA copolymer appears to influence lens properties but not in a predictable manner. Some formulations (e.g., 1, 5, and 8) can be used to prepare lenses which have very good tensile properties and can pass a pin hole test.

TABLE 12

| Sample No. | Composition (weigh fraction) | | | SatB (N/mm$^2$) | Modulus (N/mm$^2$) | EatB (%) | Pin Hole Test* |
|---|---|---|---|---|---|---|---|
| | Nelfilcon | Copolymer | water | | | | |
| 1 | 0.8083 | 0.1826 | 0.0091 | 0.642 | 0.369 | 233 | 2 |
| 2 | 0.8839 | 0.1056 | 0.0105 | 0.451 | 0.381 | 168 | 2 |
| 3 | 0.7909 | 0.1531 | 0.0560 | 0.606 | 0.396 | 133 | 1 |
| 4 | 0.7983 | 0.1239 | 0.0778 | 0.542 | 0.283 | 109 | 1 |
| 5 | 0.7895 | 0.1078 | 0.1027 | 1.267 | 0.329 | 212 | 2 |
| 6 | 0.7015 | 0.2024 | 0.0961 | | | | 1 |
| 7 | 0.8361 | 0.1537 | 0.0102 | 0.311 | 0.388 | 76 | 2 |
| 8 | 0.8287 | 0.1119 | 0.0594 | 1.062 | 0.568 | 272 | 2 |
| 9 | 0.7345 | 0.2089 | 0.0566 | 0.195 | 0.269 | 65 | 1 |
| 10 | 0.8165 | 0.1277 | 0.0558 | 0.355 | 0.431 | 86 | 2 |
| 11 | 0.7865 | 0.2034 | 0.0101 | 0.590 | 0.414 | 157 | 1 |
| 12 | 0.7899 | 0.1068 | 0.1033 | 0.159 | | 40 | 2 |
| 13 | 0.6957 | 0.2039 | 0.1004 | | | | |
| 14 | 0.8918 | 0.0984 | 0.0098 | 0.691 | 0.466 | 126 | 2 |

*1 = broke; 2 = not broke

Example 9

Preparation of Isocyanate-Capped Poly(Urethane)

Isocyanate-capped poly(urethane) A is prepared as follows. PEG-1000 (861.30 grams) and TMP (21.67 grams) are combined and heated at 75° C. The resulting melt is dried over 85 grams of 3 angstrom molecular sieves for about 24 hours at 60° C. IPDI (316.90 grams) is mixed with to the PEG/TMP melt and the resulting mixture is heated at 60° C. for about one hour. The reaction mixture is then decanted away from the melt and stirred at 75° C. under nitrogen until the percentage of NCO in the prepolymer is about 2.12% by weight. The total reaction time is about 159 hours.

Isocyanate-capped poly(urethane) B is prepared as follows. To a 60° C. A melt consisting of PEG-1000 (701.20 grams), Pluronic 17R2 (78.46 grams) and TMP (24.77 grams) is added 80 grams of activated molecular sieves (3 angstrom). To the 60° C. melt is added IPDI (287.16 grams) and the mixture is stirred at 75° C. under nitrogen until the percentage of NCO in the prepolymer is about 2.0% by weight. The total reaction time is about 98 hours. A 30 weight percent solution of this sample in water had a viscosity of 2670 cps.

Preparation of Photocurable Poly(Urethane) Prepolymer

The above NCO terminated poly(urethane) (polyurethane prepolymer) A and B are converted to a TBAM capped poly(urethane) A and B in approximately 200 gram portions in 1-liter plastic beakers. To each sample of poly(urethane) is added a calculated 1-equivalent of TBAM. Samples are mixed thoroughly using plastic rods and then checked by FT-IR. Additional TBAM is added dropwise until NCO is consumed. Aqueous solutions containing about 30 percent by weight of poly(urethane) are prepared by diluting TBAM capped poly(urethane) samples with de-ionized water containing 0.05% by weight of Irgacure 2959.

Lens Preparation

The above two polyurethane prepolymers, A and B, are blended with nelfilcon to form a series of samples for making contact lenses under various irradiation conditions. The composition of each of the samples is listed in Table 13. Sample preparation is described as follows. Nelfilcon aqueous solution is weighed in a capped vial. The polyurethane prepolymer is weighed in another vial and then added to the nelficon vial and mixed thoroughly. A clear aqueous solution is obtained.

TABLE 13

| | Composition (Wt. Fraction) | | | Half Curing Time (sec) | UV Intensity (mW/cm$^2$) |
|---|---|---|---|---|---|
| | | Polyurethane prepolymer | | | |
| Sample No. | Nelfilcon | A | B | | |
| 1 | 0.8501 | 0.1499 | | 6.50 | 2.26 |
| 2 | 0.8499 | | 0.1501 | 6.50 | 2.26 |
| 3 | 0.9437 | 0.0563 | | 6.50 | 2.26 |
| 4 | 0.9438 | | 0.0562 | 6.50 | 2.26 |
| 5 | 0.8501 | 0.1499 | | 4.15 | 2.26 |
| 6 | 0.8499 | | 0.1501 | 4.15 | 2.26 |
| 7 | 0.9437 | 0.0563 | | 4.15 | 2.26 |
| 8 | 0.9438 | | 0.0562 | 4.15 | 2.26 |
| 9 | 0.8501 | 0.1499 | | 6.50 | 1.67 |
| 10 | 0.8499 | | 0.1501 | 6.50 | 1.67 |
| 11 | 0.9437 | 0.0563 | | 6.50 | 1.67 |
| 12 | 0.9438 | | 0.0562 | 6.50 | 1.67 |
| 13 | 0.8501 | 0.1499 | | 4.15 | 1.67 |
| 14 | 0.8499 | | 0.1501 | 4.15 | 1.67 |
| 15 | 0.9437 | 0.0563 | | 4.15 | 1.67 |
| 16 | 0.9438 | | 0.0562 | 4.15 | 1.67 |
| 17 | 0.9004 | 0.0996 | | 5.17 | 1.93 |
| 18 | 0.8992 | | 0.1008 | 5.17 | 1.93 |

Contact lenses are prepared from the above-prepared samples. Using methods described in Example 2. The monomer mixture in the molds containing the sample is cured by a UV lamp for times and intensities listed in Table 13. Casting mold halves containing lenses are first placed in deionized water to soak for several seconds and then lenses are removed from the mold halves. Lenses are placed in glass vials containing isotonic borate buffered saline solution contained 0.005% poloxomer) and then autoclaved prior to measuring physical properties. Lens properties are reported in Table 14.

Lens clarity of lenses generally decreases as the polyurethane level increases. This effect is larger at the higher polyurethane level for the higher curing times for those lenses made from a blend of prepolymer A and nelfilcon.

Peak stress of lenses made from a blend of nelfilcon and prepolymer A increases slightly as the curing time increases for the lower UV intensity but is relatively constant for the high UV intensity. At the low curing time, peak stress of lenses made from a blend of nelfilcon and prepolymer B increases as the UV intensity decreases and as the polyurethane level decreases. The situation reverses at the high curing time.

Elongation at break of lenses made from a blend of nelfilcon and prepolymer A increases as the polyurethane level decreases at the low UV intensity and increases at the high polyurethane level at the high UV intensity. Elongation at break of lenses made from a blend of nelfilcon and prepolymer B increases as the polyurethane level decreases and as the UV intesity increases for the low cure time. The situation with the high curing time reverse for the polyurethane level at the low UV intensity and increases at the high polyurethane level at the high UV intensity.

Modulus of lenses decreases as the polyurethane level increases. The effect is greater at the high UV intensity at the higher polyurethane level. Energy to break (toughness) increases as the polyurethane level decreases at the low UV intensity. Energy to break (toughness) increases as the polyurethane level decreases at the low curing time. The reverse is true at the high curing time.

TABLE 14

| Sample No. | Lens Clarity$^a$ | Diameter (mm) | Center Thickness (mm) | Peak Stress (N/mm$^2$) | Elongation at Break (%) | Modulus (N/mm$^2$) | Energy to Break (N * mm) |
|---|---|---|---|---|---|---|---|
| 1 | 3 | 13.98 | 0.267 | 1.418 | 562 | 0.356 | 17.425 |
| 2 | 3 | 13.93 | 0.274 | 2.312 | 442 | 0.356 | 14.482 |
| 3 | 1 | 13.85 | 0.263 | 1.560 | 371 | 0.367 | 14.344 |
| 4 | 1 | 13.83 | 0.269 | 1.375 | 421 | 0.399 | 18.688 |
| 5 | 2 | 13.96 | 0.268 | 1.205 | 385 | 0.376 | 15.701 |
| 6 | 2 | 14.01 | 0.264 | 1.268 | 379 | 0.344 | 11.004 |

TABLE 14-continued

| Sample No. | Lens Clarity[a] | Diameter (mm) | Center Thickness (mm) | Peak Stress (N/mm²) | Elongation at Break (%) | Modulus (N/mm²) | Energy to Break (N * mm) |
|---|---|---|---|---|---|---|---|
| 7 | 1 | 13.86 | 0.272 | 1.430 | 368 | 0.415 | 16.335 |
| 8 | 1 | 13.89 | 0.268 | 1.501 | 398 | 0.370 | 17.719 |
| 9 | 3 | 13.96 | 0.270 | 0.972 | 288 | 0.325 | 8.575 |
| 10 | 3 | 13.96 | 0.270 | 1.374 | 394 | 0.324 | 15.428 |
| 11 | 1 | 13.91 | 0.269 | 1.366 | 428 | 0.398 | 19.492 |
| 12 | 1 | 13.91 | 0.277 | 1.117 | 338 | 0.377 | 12.422 |
| 13 | 2 | 14.00 | 0.272 | 1.608 | 274 | 0.311 | 6.756 |
| 14 | 2 | 14.00 | 0.268 | 0.950 | 297 | 0.293 | 7.738 |
| 15 | 1.5 | 14.03 | 0.278 | 1.272 | 424 | 0.382 | 19.409 |
| 16 | 1.5 | 14.05 | 0.267 | 1.819 | 451 | 0.395 | 22.700 |
| 17 | 1.5 | 13.99 | 0.272 | 1.594 | 392 | 0.382 | 18.989 |
| 18 | 1.5 | 14.05 | 0.275 | 1.410 | 329 | 0.372 | 13.401 |
| Control[b] | | 13.80 | 0.266 | 0.370 | 276 | 0.276 | 3.402 |

[a]Visual clarity scale: 1 = clear; 5 = hazy
[b]Focus Dailies lenses (−1.00 D)

Example 10

Polyurethane prepolymers A and B are prepared as described in Example 9. The polyurethane prepolymers A and B are blended with nelfilcon to form a series of samples for making contact lenses under various curing time conditions. The composition of each of the samples listed in Table 15. Samples are prepared as described in Example 9.

TABLE 15

| | Composition (Wt. Fraction) | | | |
|---|---|---|---|---|
| Sample No. | Nelfilcon | Polyurethane prepolymer A | Polyurethane prepolymer B | Half Cure Time (second) |
| 1 | 0.8999 | 0.1001[a] | | 4 |
| 2 | 0.8996 | | 0.1004[b] | 4 |
| 3 | 0.9498 | 0.0502[a] | | 4 |
| 4 | 0.9499 | | 0.0501[b] | 4 |
| 5 | 0.8999 | 0.1001[a] | | 3 |
| 6 | 0.8996 | | 0.1004[b] | 3 |
| 7 | 0.9498 | 0.0502[a] | | 3 |
| 8 | 0.9499 | | 0.0501[b] | 3 |
| 9 | 0.9249 | 0.0751[a] | | 3.5 |
| 10 | 0.9249 | | 0.0751[b] | 3.5 |

Contact lenses are prepared from the above-prepared samples using methods described in Example 2. The UV irradiation is t 2 mWcm$^{-2}$ for times listed in Table 2. Lenses are placed in glass vials containing isotonic borate buffered saline (saline solution contained 0.005% poloxomer) and then autoclaved prior to measuring physical properties.

Lens properties are reported in Table 16. All lenses made from a blend of nelfilcon have values of elongation at break and energy to break much greater than those control lenses

TABLE 16

| Sample No. | Clarity[a] | Diameter (mm) | Center Thickness (mm) | Peak Stress (N/mm²) | Elongation at Break (%) | Modulus (N/mm²) | Energy to Break (N * mm) |
|---|---|---|---|---|---|---|---|
| 1 | 1.5 | 13.84 | 0.272 | 1.159 | 369 | 0.519 | 16.223 |
| 2 | 1.5 | 13.90 | 0.274 | 0.698 | 267 | 0.495 | 4.443 |
| 3 | 1 | 13.74 | 0.272 | 1.486 | 361 | 0.597 | 18.659 |
| 4 | 1 | 14.00 | 0.264 | 0.896 | 237 | 0.455 | 6.147 |
| 5 | 2 | 13.96 | 0.266 | 1.166 | 344 | 0.418 | 14.158 |
| 6 | 2 | 13.78 | 0.266 | 1.288 | 319 | 0.444 | 12.884 |
| 7 | 1 | 13.76 | 0.272 | 0.896 | 246 | 0.456 | 7.664 |
| 8 | 1 | 13.89 | 0.261 | 1.044 | 285 | 0.446 | 9.608 |
| 9 | 1 | 13.82 | 0.268 | 1.453 | 224 | 0.576 | 9.230 |
| 10 | 1 | 13.98 | 0.274 | 1.682 | 294 | 0.548 | 15.488 |
| Control[b] | | 13.80 | 0.226 | 0.436 | 175 | 0.378 | 2.680 |

[a]Visual clarity scale: 1 = clear; 5 = hazy
[b]Focus Dailies lenses, power −1.00 D

Example 11

Preparation of vinyl-substituted DMA copolymer. Vinyl-substituted DMA copolymer is prepared as described in Example 8.

Preparation of polyurethane prepolymer. NCO terminated poly(urethane) is prepared as follows. PEG-1000 (962.6 grams), TMP (32.28 grams), and IPDI (222.3 grams) are combined in a round flask which is equipped with a gas inlet valve and a paddle stirring device. The flask is placed in a preheated 75° C. oil bath and nitrogen is passed through the reaction vessel for several minutes. The reaction mixture is then heated under nitrogen at about 75° C. for about 107 hours. The conversion of NCO is monitored by titration.

The above NCO terminated poly(urethane) is converted to TBAM capped poly(urethane) in approximately 200 gram portions in 1-liter plastic beakers. To each sample of poly (urethane) is added a calculated 1-equivalent of TBAM.

Samples are mixed thoroughly using plastic rods and then checked by FT-IR. Additional TBAM is added dropwise until NCO is consumed. Aqueous solutions containing about 30 weight percent poly(urethane) and 0.05 weight percent Irgacure 2959 are prepared by adding de-ionized water and Irgacure 2959 into each sample.

The above DMA copolymer and polyurethane prepolymer are blended with nelfilcon to form a series of samples (Table 17) for making contact lenses according to a D-Optimal crossed mixture design with 14 points. The results show, upon regression analysis, that break stress over that expected for pure nelfilcon increases as the amount of DMA and polyurethane copolymers increase. The same is true for elongation at break.

TABLE 17

| | Composition (Wt. Fraction) | | |
|---|---|---|---|
| Sample No. | Nelfilcon | DMA copolymer | Polyurethane prepolymer |
| 1 | 0.8525 | 0.0985 | 0.0490 |
| 2 | 0.8958 | 0.0580 | 0.0462 |
| 3 | 0.8869 | 0.0693 | 0.0438 |
| 4 | 0.9289 | 0.0553 | 0.0158 |
| 5 | 0.8798 | 0.1079 | 0.0123 |
| 6 | 0.9400 | 0.0413 | 0.0187 |
| 7 | 0.8798 | 0.0827 | 0.0375 |
| 8 | 0.9249 | 0.0484 | 0.0267 |
| 9 | 0.9109 | 0.0558 | 0.0333 |
| 10 | 0.8731 | 0.0976 | 0.0293 |
| 11 | 0.8815 | 0.1067 | 0.0118 |
| 12 | 0.8995 | 0.0497 | 0.0508 |
| 13 | 0.8481 | 0.1019 | 0.0500 |
| 14 | 0.9680 | 0.0185 | 0.0135 |

Nelfilcon aqueous solution is weighed in a capped vial. The polyurethane prepolymer and DMA copolymer are weighed in separated vials and then sufficient deionized water is added to make 30% by weight solutions. The DMA copolymer aqueous solution and the polyurethane prepolymer aqueous solution are added to the nelfilcon vial and mixed thoroughly. All solutions are hazy but all lenses are clear.

Contact lenses are prepared from the above-prepared sample using methods listed in Example 2. Monomer mixtures are irradiated at about 2.2 mWcm$^{-2}$ for about 10 seconds. Lenses are removed from the molds, placed in glass vials containing isotonic borate buffered saline (saline solution contained 0.005% poloxomer) and then sterilized. Lens properties are reported in Table 18.

TABLE 18

| Sample No. | Stress at Break (N/mm$^2$) | Modulus (N/mm$^2$) | Elongation At Break (%) | Max. Break Stress (N/mm$^2$) | Max. Elongation at Break (%) |
|---|---|---|---|---|---|
| 1 | 1.116 | 0.647 | 290 | 1.784 | 330 |
| 2 | 1.211 | 0.769 | 330 | 2.191 | 347 |
| 3 | 1.378 | 0.780 | 248 | 2.280 | 383 |
| 4 | 0.780 | 0.868 | 119 | 1.994 | 351 |
| 5 | 1.536 | 0.803 | 224 | 2.207 | 378 |
| 6 | 1.080 | 0.749 | 217 | 1.778 | 404 |
| 7 | 0.622 | 0.579 | 110 | 2.014 | 239 |
| 8 | 1.833 | 0.884 | 221 | 2.058 | 361 |
| 9 | 1.468 | 0.899 | 217 | 1.908 | 342 |
| 10 | 1.790 | 0.766 | 251 | 2.414 | 349 |
| 11 | 2.227 | 0.679 | 273 | 4.493 | 373 |
| 12 | 1.292 | 0.943 | 192 | 2.014 | 347 |
| 13 | 1.568 | 0.718 | 277 | 2.230 | 378 |
| 14 | 1.535 | 0.920 | 271 | 2.037 | 385 |

Example 12

Preparation of vinyl-substituted DMA copolymer. Vinyl-substituted DMA copolymer is prepared as follows.

A 3-neck flask fitted with a balloon, paddle stirrer, gas inlet/outlet valves is charged DMA (23.812 g), GMA (8.079 g), BEA (2.021 g), MMA (6.100 g), vazo-52 (0.2145 g) and 225 mL of toluene. The flask is filled with nitrogen until the attached 9 inch capacity balloon on the reaction flask is filled. Vacuum is then applied until the balloon collapsed and the reaction mixture just began to bubble. This operation is repeated about five times and then the reaction mixture is blanketed with nitrogen. The reaction mixture is heated at 55° C. under nitrogen for about 20 hours. The poly(DMA/GMA/BEA/MMA) is precipitated by pouring the toluene solution into 1500 mL of hexanes. The copolymer is then dissolved in about 750 mL of toluene and converted to photo-curable copolymer as described below.

Conversion of Poly(DMA/GMA/BEA/MMA) to a Photo-Curable Copolymer

Approximately 700 mL of toluene solution containing a calculated 35 grams of the obtained poly(DMA/GMA/BEA/MMA) is combined with DABCO (1.172 grams), 4-methoxyphenol (0.209 grams), and 500 mL of toluene. The reaction mixture is then heated to about 65° C. and then methacrylic acid (24.36 g) is added. The reaction mixture is then heated to about 80° C. for about 30 hours. The resulting photo-curable copolymer is isolated by pouring the reaction mixture into about 1000 mL of hexanes and dried in a vacuum oven at about 30° C. for a few hours. The photo-curable copolymer is then dissolved in THF and reprecipitated in about 1 liter of hexanes. The precipitated copolymer is dissolved in THF and re-precipitated in hexanes and then dried for a few days in a vacuum oven. Approximately 20 mg of sample is dissolved in about 0.5 mL of chloroform and then a film is cast onto a NaCl disk. The film is dried at about 50° C. for 10 minutes. FT-IR analysis showed characteristic ester and amide CO peaks near 1726 and 1643 cm$^{-1}$ respectively.

A 30 weight percent solution of the copolymer in water containing 0.033 weight percent Irgacure 2959 had viscosity of 1270 cps at 25° C. Contact lenses with water content of about 74 percent are obtained by photo-curing this solution at about 2.5 mW/cm$^2$ for 20 seconds.

Preparation of polyurethane prepolymer. NCO terminated poly(urethane) is prepared as follows. PEG-1000 is dried over 3 A molecular sieves at 65° C. for about 4 days prior to use. A ratio of sieves to PEG is about 1:10. PEG-1000 (962.6 grams), TMP (32.28 grams), and IPDI (222.3 grams) are combined in a round flask that is equipped with a gas inlet valve and a paddle-stirring device. The flask is placed in a preheated 75° C. oil bath and nitrogen is passed through the reaction vessel for several minutes. The reaction mixture is then heated under nitrogen at about 75° C. for about 107 hours. The conversion of NCO is monitored by titration.

The above NCO terminated poly(urethane) is converted to TBAM capped poly(urethane) in approximately 200 gram portions in 1-liter plastic beakers. To each sample of poly(urethane) is added a calculated 1-equivalent of TBAM. Samples are mixed thoroughly using plastic rods and then checked by FT-IR. Additional TBAM is added dropwise until NCO is consumed. Aqueous solutions containing about 30 weight percent poly(urethane) and 0.05 weight percent Irgacure 2959 are prepared by adding de-ionized water and Irgacure 2959 into each sample.

The above DMA copolymer and polyurethane prepolymer are blended with nelfilcon to form a series of samples (Table 19) for making contact lenses.

TABLE 19

| | Composition (Wt. Fraction) | | | |
|---|---|---|---|---|
| Sample No. | Nelfilcon | Polyurethane prepolymer | DMA copolymer | DMA copolymer type |
| 1 | 0.8388 | 0.1088 | 0.0524 | 1310-2 |
| 2 | 0.7945 | 0.1010 | 0.1045 | 1297-90 |
| 3 | 0.7936 | 0.1032 | 0.1032 | 1310-2 |
| 4 | 0.8513 | 0.0506 | 0.0981 | 1310-2 |
| 5 | 0.8452 | 0.0524 | 0.1024 | 1297-90 |
| 6 | 0.8421 | 0.1039 | 0.0540 | 1297-90 |
| 7 | 0.8961 | 0.1039 | | |
| 8 | 0.8942 | 0.0590 | 0.0468 | 1297-90 |
| 9 | 0.9043 | | 0.0957 | 1297-90 |
| 10 | 0.9032 | | 0.0968 | 1310-2 |
| 11 | 0.8949 | 0.0535 | 0.0516 | 1310-2 |
| 12 | 0.8907 | 0.1093 | | |
| 13 | 0.8339 | 0.0822 | 0.0839 | 1297-90 |
| 14 | 0.8358 | 0.0829 | 0.0813 | 1310-2 |
| 15 | 0.8619 | 0.0711 | 0.0670 | 1297-90 |
| 16 | 0.8668 | 0.0680 | 0.0652 | 1310-2 |

TABLE 19-continued

| | Composition (Wt. Fraction) | | | |
|---|---|---|---|---|
| Sample No. | Nelfilcon | Polyurethane prepolymer | DMA copolymer | DMA copolymer type |
| 17 | 0.8656 | 0.0946 | 0.0398 | 1297-90 |
| 18 | 0.8933 | 0.1067 | | |
| 19 | 0.8977 | | 0.1023 | 1310-2 |
| 20 | 0.8994 | | 0.1006 | 1297-90 |
| 21 | 0.7992 | 0.0997 | 0.1011 | 1310-2 |
| 22 | 0.8928 | 0.1072 | | |

Nefilcon aqueous solution is weighed in a capped vial. The polyurethane prepolymer and DMA copolymer are weighed in separated vials and then sufficient deionized water is added to make 30% by weight solutions. The DMA copolymer aqueous solution and the polyurethan prepolymer aqueous solution are added to the nelfcon vial and mixed thoroughly.

Contact lenses are prepared from the above-prepared samples using methods described in Example 2. Monomer solutions are irradiated at about 2.2 mWcm$^{-2}$ for about 10 seconds. Lenses are removed from the molds, placed in glass vials containing isotonic borate buffered saline (saline solution contained 0.005% poloxomer) and then sterilized. Lens properties are reported in Table 20. The regression analysis shows that the break stress increases as the concentration of the urethane and DMA copolymer increases. This indicates that properties of pure nelfilcon have been improved by the addition of these components.

TABLE 20

| Sample No. | Stress at Break (N/mm$^2$) | | Elongation at Break (%) | | Modulus (N/mm$^2$) | Pin Hole Test[1] | Lens Clarity[2] |
|---|---|---|---|---|---|---|---|
| | Average | Maximum | Average | Maximum | | | |
| 1 | 1 | 1 | 1 | 1 | 1 | 1 | 1 |
| 2 | 1.006 | 1.479 | 125 | 146 | 0.761 | 3 | 1 |
| 3 | | | | | | 2 | 1 |
| 4 | | | | | | | |
| 5 | 1.655 | 3.101 | 199 | 345 | 0.793 | 4 | 1 |
| 6 | 0.986 | 1.561 | 149 | 260 | 0.792 | 4 | 1 |
| 7 | 2.181 | 2.181 | 284 | 284 | 0.608 | 1 | 2 |
| 8 | 0.700 | 1.010 | 112 | 126 | 0.564 | 1 | 1 |
| 9 | 1.651 | 2.198 | 176 | 208 | 0.722 | 1.5 | 1 |
| 10 | 1.707 | 2.456 | 216 | 286 | 0.748 | 1 | 1 |
| 11 | 1.118 | 1.487 | 148 | 186 | 0.665 | 1 | 1 |
| 12 | | | | | | 1 | 2 |
| 13 | 1.000 | 1.706 | 140 | 254 | 0.651 | 3 | 1 |
| 14 | 1.531 | 1.688 | 240 | 314 | 0.697 | 1 | 1 |
| 15 | 1.372 | 2.372 | 189 | 336 | 0.693 | 1 | 1 |
| 16 | 0.439 | 0.475 | 89 | 104 | 0.551 | 1 | 1 |
| 17 | 0.437 | 0.849 | 81 | 172 | 0.485 | 4 | 1 |
| 18 | 0.801 | 1.313 | 150 | 224 | 0.527 | 5 | 3 |
| 19 | 1.356 | 2.237 | 177 | 360 | 0.740 | 1 | 1 |
| 20 | 1.401 | 2.296 | 142 | 192 | 0.754 | 4 | 1 |
| 21 | 0.671 | 1.459 | 95 | 190 | 0.708 | 2 | 1 |
| 22 | 2.223 | 3.122 | 246 | 312 | 0.650 | 1 | 3 |
| Control | 0.939 | 1.273 | 303 | 377 | 0.522 | | |

*Focus Dailies Lenses (−1.00 D)
[1]Pin Hole Test: 1 = very good, 5 = fail
[2]This is visual clarity after autoclaving; 1 = clear, 5 = hazy Example 13

Poly N-vinyl pyrrolidone (NVP) polymers, PVK-15 and PVK-30, are supplied by International Specialty Products. The NVP polymers are used as 30% (w/w/) solutions in deionized water. The PVK-15 has a molecular weight of about 9,700 and the PVK-30 has a molecular weight of about 67,000.

The NVP polymers are blended with nelfilcon to prepare a series of samples for making contact lenses. The composition of each of the samples is listed in Table 21. Sample preparation is described as follows. Nelfilcon aqueous solution (Example 1) is weighed in a capped vial. The NVP polymer is weighed in another vial. The NVP polymer solution is added to the nelfilcon vial and mixed thoroughly.

Contact lenses are prepared from the above-prepared aqueous solution according methods described in Example 2. Monomer solutions are irradiated at 1.9 mWcm$^{-2}$ for 10 seconds. Lenses are placed in glass vials containing isotonic borate buffered saline (saline solution contained 0.005% poloxomer) and then sterilized by autoclave.

Lens properties are reported in Table 21. All lenses are clear after autoclaving. Lens properties (stress at break, elongation at break and modulus) decrease linearly with increasing content of NVP polymer. The diminution of lens properties (stress at break, elongation at break and modulus) is greater for the NVP polymer having a higher molecular weight. This behavior contrasts with behavior, shown previously, of copolymers of N-vinyl pyrrolidone with hydrophobic comonomers such as vinyl acetate and 1-butene. The hydrophobic comonomers add reinforcement as shown by the increases in one or more key lens properties.

TABLE 21

| Sample No. | Composition (Wt. Fraction) | | Diameter (mm) | Center Thickness (mm) | Stress at Break (N/mm$^2$) | Elongation at Break (%) | Modulus (N/mm$^2$) |
| --- | --- | --- | --- | --- | --- | --- | --- |
| | Nelfilcon | NVP polymer | | | | | |
| 1 | 0.8983 | 0.1017$^a$ | 13.98 | 0.267 | 1.418 | 562 | 0.356 |
| 2 | 0.7953 | 0.2047$^a$ | 13.93 | 0.274 | 2.312 | 442 | 0.356 |
| 3 | 0.7057 | 0.2943$^a$ | 13.85 | 0.263 | 1.560 | 371 | 0.367 |
| 4 | 0.9004 | 0.0996$^b$ | 13.83 | 0.269 | 1.375 | 421 | 0.399 |
| 5 | 0.8002 | 0.1998$^b$ | 13.96 | 0.268 | 1.205 | 385 | 0.376 |
| 6 | 0.6999 | 0.3001$^b$ | 14.01 | 0.264 | 1.268 | 379 | 0.344 |
| Control | 1.0000 | | 13.80 | 0.266 | 0.370 | 276 | 0.276 |

$^a$PVK-15
$^b$PVK-30

Evidently the hydrophobic groups are required to give reinforcement. The diminution of properties with the pure n-vinyl pyrrolidone polymer blend with nelfilcon could result from the decrease in cross-link density since these polymers are not co-curable. However, the dilution of cross-link density does not explain the increase in physical properties when nelfilcon is blended with non-curing N-vinyl pyrrolidone/hydrophobic monomer copolymers.

What is claimed is:

1. A polymerizable material for making an ophthalmic device comprising:

(a) a water-soluble polyvinyl alcohol having crosslinkable groups; and (b) nanoparticles having a hydrophilic surface, wherein component (b) is presented in the polymerizable material in an amount sufficient to improve one or more physical properties of the ophthalmic device made from the polymerizable material, wherein the one or more physical properties are selected from the group consisting of stress at break (N/mm$^2$), percentage of elongation at break, toughness or energy to break (N·mm), and susceptibility to fracture, wherein said water-soluble polyvinyl alcohol is a polyhydroxyl compound which has a weight average molecular weight of at least about 2000 and which comprises from about 0.5 to about 80%, based on the number of hydroxyl groups in the poly(vinyl alcohol), of units of the formula I, I and II, I and III, or I and II and III

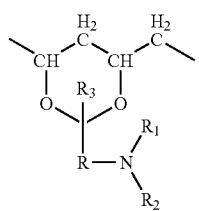

in which R is alkylene having up to 12 carbon atoms, $R_1$ is hydrogen or lower alkyl, $R_2$ is an olefinically unsaturated, electron-withdrawing, crosslinkable radical having up to 25 carbon atoms, and $R_3$ is hydrogen, a $C_1$-$C_6$ alkyl group or a cycloalkyl group,

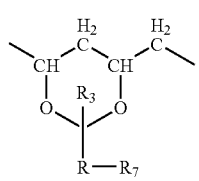

wherein R and $R_3$ are as defined above, and $R_7$ is a primary, secondary or tertiary amino group or a quaternary amino group of the formula $N^+(R')_3 X^-$, in which each R', independently of the others, is hydrogen or a $C_1$-$C_4$ alkyl radical and X is $HSO_4^-$, $F^-$, $Cl^-$, $Br^-$, $I^-$, $CH_3 COO^-$, $OH^-$, $BF^-$, or $H_2PO_4^-$,

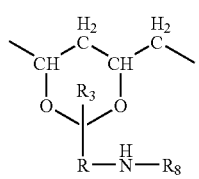

in which R and $R_3$ are as defined above, and $R_8$ is the radical of a monobasic, dibasic or tribasic, saturated or unsaturated, aliphatic or aromatic organic acid or sulfonic acid.

2. A polymerizable material of claim 1, wherein said water-soluble polyvinyl alcohol is a polyhydroxyl compound which has a molecular weight of at least about 2000 and which comprises from about 0.5 to about 80%, based on the number of hydroxyl groups in the poly(vinyl alcohol), of units of the formula I, wherein $R_2$ is a radical of formula IV or formula V

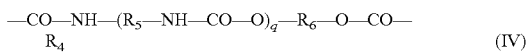

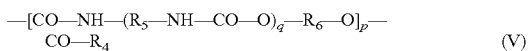

in which p and q, independently of one another, are zero or one, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which $R_4$ is an olefinically unsaturated copolymerizable radical having 2 to 24 carbone atoms, preferably having 2 to 8 carbon atoms, more preferably having 2 to 4 carbon atoms.

3. A polymerizable material of claim 1, wherein the nanoparticles are nano-sized silica fillers.

* * * * *